United States Patent
Ozaki

(10) Patent No.: US 11,223,781 B2
(45) Date of Patent: Jan. 11, 2022

(54) IMAGE-CAPTURING APPARATUS AND IMAGE-CAPTURING METHOD

(71) Applicant: SONY CORPORATION, Tokyo (JP)

(72) Inventor: Koji Ozaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/638,505

(22) PCT Filed: Jul. 19, 2018

(86) PCT No.: PCT/JP2018/027057
§ 371 (c)(1),
(2) Date: Feb. 12, 2020

(87) PCT Pub. No.: WO2019/039144
PCT Pub. Date: Feb. 28, 2019

(65) Prior Publication Data
US 2020/0374441 A1 Nov. 26, 2020

(30) Foreign Application Priority Data
Aug. 21, 2017 (JP) .............................. JP2017-158532

(51) Int. Cl.
*H04N 5/238* (2006.01)
*G02B 7/38* (2021.01)

(52) U.S. Cl.
CPC ............... *H04N 5/238* (2013.01); *G02B 7/38* (2013.01)

(58) Field of Classification Search
CPC .................................. H04N 5/238; G02B 7/38
See application file for complete search history.

(56) References Cited

U.S. PATENT DOCUMENTS

2002/0186976 A1\* 12/2002 Seo .................. G03B 17/48
396/429
2007/0051876 A1 3/2007 Sumi et al.
(Continued)

FOREIGN PATENT DOCUMENTS

CN 102868864 A 1/2013
JP 2002-369049 A 12/2002
(Continued)

OTHER PUBLICATIONS

International Search Report and Written Opinion of PCT Application No. PCT/JP2018/027057, dated Oct. 2, 2018, 10 pages of ISRWO.

*Primary Examiner* — Nasim N Nirjhar
(74) *Attorney, Agent, or Firm* — Chip Law Group

(57) ABSTRACT

[Object] To provide an image-capturing apparatus, an image-capturing method, and a program that are suitable to perform image-capturing with pieces of light of different wavelengths. [Solving Means] An image-capturing apparatus according to the present technology includes an imaging element, an optical element, a first stop, a second stop, and a stop controller. The imaging element performs wavelength separation on incident light to obtain first light of a first wavelength and second light of a second wavelength, and photoelectrically converts the first light and the second light, the first light and the second light being included in the incident light. The optical element collects light in the image-capturing apparatus. The first stop is provided in a path of the incident light, and includes a first opening portion and a first blocking portion, the first opening portion being a portion through which the first light and the second light are transmitted, the first blocking portion being a portion that blocks the first light and through which the second light is transmitted. The second stop is provided in the path of the incident light, and includes a second opening portion and a (Continued)

second blocking portion, the second opening portion being a portion through which the first light and the second light are transmitted, the second blocking portion being a portion that blocks the second light and through which the first light is transmitted. The stop controller separately controls a size of the first opening portion and a size of the second opening portion.

15 Claims, 32 Drawing Sheets

(56) References Cited

U.S. PATENT DOCUMENTS

| | | | | |
|---|---|---|---|---|
| 2013/0009263 | A1 | 1/2013 | Hatano et al. | |
| 2013/0334402 | A1* | 12/2013 | Izuha | G02F 1/015 250/208.1 |
| 2014/0133004 | A1* | 5/2014 | Wada | G02B 27/00 359/238 |
| 2015/0341573 | A1 | 11/2015 | Matsuo et al. | |
| 2015/0365609 | A1* | 12/2015 | Mine | H04N 9/04553 348/164 |
| 2017/0094198 | A1* | 3/2017 | Yun | H01L 27/307 |
| 2020/0025882 | A1* | 1/2020 | Watanabe | G01C 3/06 |

FOREIGN PATENT DOCUMENTS

| | | |
|---|---|---|
| JP | 2006-238093 A | 9/2006 |
| JP | 2012-022308 A | 2/2012 |
| JP | 2013-016729 A | 1/2013 |
| JP | 2015-195489 A | 11/2015 |
| WO | 2014/122714 A1 | 8/2014 |

* cited by examiner

|  |  | Visible light stop | | |
|---|---|---|---|---|
|  |  | Made small | Medium | Opened |
| Infrared stop | Made small | Road of city center in fine weather | Highway with roadside trees in fine weather | Road with many plants such as forest in fine weather (Leaves appear bright in infrared) |
|  | Medium | Road with low building in fine weather | Road of urban area in cloudy or rainy weather | Road with many plants such as forest in cloudy or rainy weather |
|  | Opened | Road with view of horizon in fine weather (Sky appears dark in infrared) | Road with view of horizon in cloudy or rainy weather | Road at night or in tunnel e.g. during high-speed running (high-speed shutter) |

FIG.23

|  | | Visible light stop | | |
|---|---|---|---|---|
|  | | Made small | Medium | Opened |
| Infrared stop | Made small | Measurement of long distance / short distance on expressway, etc. Distance to distant sign or auto, etc. | Measurement of medium distance / short distance in area outside of city, etc. Distance to auto ahead, etc. | Measurement of short distance when parking, etc. Distance to nearby person, etc. |
| | Medium | Measurement of medium distance / short distance in area outside of city, etc. | Measurement of medium distance / short distance in area outside of city, etc. | Measurement of short distance when parking, etc. |
| | Opened | Measurement of short distance when parking, etc. | Measurement of short distance when parking, etc. | Measurement of short distance when parking, etc. |

FIG.24

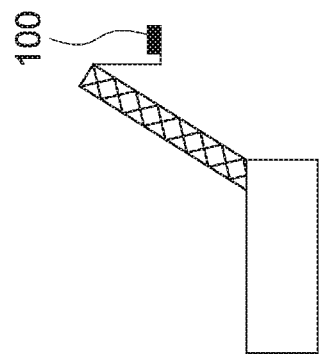
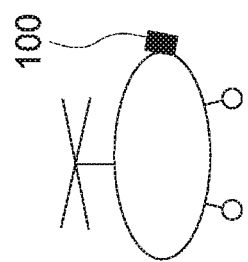
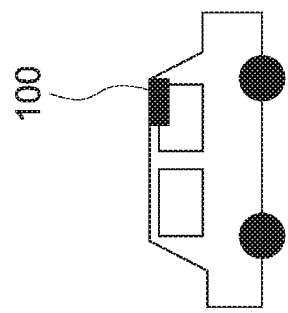
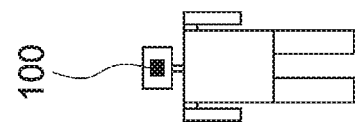
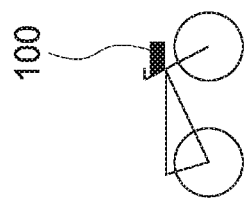
FIG. 30A
FIG. 30B
FIG. 30C
FIG. 30D
FIG. 30E

IMAGE-CAPTURING APPARATUS AND IMAGE-CAPTURING METHOD

CROSS REFERENCE TO RELATED APPLICATIONS

This application is a U.S. National Phase of International Patent Application No. PCT/JP2018/027057 filed on Jul. 19, 2018, which claims priority benefit of Japanese Patent Application No. JP 2017-158532 filed in the Japan Patent Office on Aug. 21, 2017. Each of the above-referenced applications is hereby incorporated herein by reference in its entirety.

TECHNICAL FIELD

The present technology relates to an image-capturing apparatus, an image-capturing method, and a program that make it possible to perform image-capturing with pieces of light of different wavelengths.

BACKGROUND ART

A technology has been developed that performs image-capturing in two types of wavelength bands of visible light and infrared light, and calculates a distance between an image-capturing apparatus and a subject (for example, Patent Literature 1). In this technology, an image-capturing apparatus includes a structured opening for infrared light and a stop, and calculates a distance to a subject using an infrared image and a visible light image that are captured through the structured opening.

CITATION LIST

Patent Literature

Patent Literature 1: Japanese Patent Application Laid-open No. 2012-22308

DISCLOSURE OF INVENTION

Technical Problem

However, in the configuration disclosed in Patent Literature 1, it is not possible to set an opening diameter of a stop to a value not greater than a certain value, since the structured opening will be affected if the value of the opening diameter is not greater than the certain value. Further, an infrared aperture has a constant value due to the structured opening.

Thus, when the image-capturing apparatus is installed in a movable object such as an auto, it is not possible to reduce an amount of visible light and an amount of infrared light sufficiently upon performing image-capturing in light of very high intensity such as in sunlight. Conversely, it is not possible to open an infrared stop to increase the amount of light in light of low intensity such as at night.

In view of the circumstances described above, it is an object of the present technology to provide an image-capturing apparatus, an image-capturing method, and a program that are suitable to perform image-capturing with pieces of light of different wavelengths.

Solution to Problem

In order to achieve the object described above, an image-capturing apparatus according to an embodiment of the present technology includes an imaging element, an optical element, a first stop, a second stop, and a stop controller.

The imaging element performs wavelength separation on incident light to obtain first light of a first wavelength and second light of a second wavelength, and photoelectrically converts the first light and the second light, the first light and the second light being included in the incident light.

The optical element collects light in the image-capturing apparatus.

The first stop is provided in a path of the incident light, and includes a first opening portion and a first blocking portion, the first opening portion being a portion through which the first light and the second light are transmitted, the first blocking portion being a portion that blocks the first light and through which the second light is transmitted.

The second stop is provided in the path of the incident light, and includes a second opening portion and a second blocking portion, the second opening portion being a portion through which the first light and the second light are transmitted, the second blocking portion being a portion that blocks the second light and through which the first light is transmitted.

The stop controller separately controls a size of the first opening portion and a size of the second opening portion.

This configuration makes it possible to separately control the first stop and the second stop, and thus to discretionally adjust amounts of the first light and the second light that enter the imaging element.

The first wavelength may be a wavelength of infrared light, and the second wavelength may be a wavelength of visible light.

This configuration makes it possible to separately adjust amounts of infrared light and visible light that enter the imaging element.

The first opening portion and the second opening portion may be shifted from each other in a direction orthogonal to a direction of an optical axis of the incident light.

In this configuration, when the imaging element is not focused on a subject, an image of the subject that is captured with the first light (the first image) and an image of the subject that is captured with the second light (the second image) are shifted from each other in a captured image. Thus, it is possible to, for example, calculate a distance to a subject using an amount of the shift.

At least one of a center of the first opening portion or a center of the second opening portion may coincide with a center of an optical axis of the incident light.

In this configuration, an image of light whose amount is reduced by a stop having an opening-portion center that coincides with a center of an optical axis of the incident light, is not shifted due to focusing, the light being the first light or the second light, and this makes it possible to prevent the visibility of the image from being affected.

The image-capturing apparatus may further include a distance-to-subject calculator that calculates a distance to a subject using a captured image that is captured by the imaging element, the captured image including a first image that is an image of the first light, and a second image that is an image of the second light.

The distance-to-subject calculator can calculate the distance to a subject using the captured image including the first image and the second image, since the first opening portion and the second opening portion are shifted from each other in the direction orthogonal to the direction of the optical axis of the incident light.

The distance-to-subject calculator may calculate the distance to a subject using an amount of a shift between the first image and the second image in the captured image.

Since the amount of the shift between the first image and the second image described above is changed according to the distance to a subject, the distance-to-subject calculator can calculate the distance to a subject using the amount of the shift between the first image and the second image and using a focal length of the image-capturing apparatus.

The first wavelength may be a wavelength of infrared light, the second wavelength may be a wavelength of visible light, the center of the first opening portion may be shifted from the center of the optical axis of the incident light, and the center of the second opening portion may coincide with the center of the optical axis of the incident light.

In this configuration, an image of visible light in a captured image is not shifted due to the position of an opening portion (the second opening portion) of a stop, whereas an image of infrared light in the captured image is shifted due to the position of an opening portion (the first opening portion) of a stop depending on focusing. This makes it possible to exert an effect due to a distance to a subject on the image of infrared light without affecting the image of visible light.

The imaging element may perform wavelength separation for the first wavelength and the second wavelength in a direction orthogonal to an optical axis of the incident light.

The imaging element may perform wavelength separation for the first wavelength and the second wavelength in a direction parallel to an optical axis of the incident light.

The image-capturing apparatus may further include an optical element controller that controls the optical element according to the distance to a subject.

This configuration makes it possible to cause the image-capturing apparatus to be focused on a subject, using the distance to a subject that is calculated using the amount of the shift between the first image and the second image.

The image-capturing apparatus may further include a distance image generator that generates a distance image from the distance to a subject.

This configuration enables the image-capturing apparatus to generate a distance image including distance information.

The image-capturing apparatus may further include a defocusing processing section that performs defocusing processing using an amount of a shift between a first image and a second image in a captured image that is captured by the imaging element, the captured image including the first image and the second image, the first image being an image of the first light, the second image being an image of the second light.

This configuration makes it possible to perform defocusing processing on a captured image using the amount of the shift between the first image and the second image.

The stop controller may control a size of the first opening portion and a size of the second opening portion according to an amount of the first light entering the imaging element and an amount of the second light entering the imaging element.

This configuration makes it possible to separately adjust the amount of the first light and the amount of the second light using the first stop and the second stop, and thus to perform an optimal exposure.

The stop controller may control a distance between a center of the first opening portion and a center of the second opening portion in a direction orthogonal to an optical axis of the incident light according to a movement speed of the image-capturing apparatus.

This configuration makes it possible to adjust an amount of a shift between the first image and the second image according to a distance between the center of the first opening portion and the center of the second opening portion, and thus to change the distance range to a distance range suitable to measure a distance to a subject.

In order to achieve the object described above, an image-capturing method according to an embodiment of the present technology is an image-capturing method using an image-capturing apparatus including an imaging element that performs wavelength separation on incident light to obtain first light of a first wavelength and second light of a second wavelength, and photoelectrically converts the first light and the second light, the first light and the second light being included in the incident light; an optical element that collects light in the image-capturing apparatus; a first stop that is provided in a path of the incident light, and includes a first opening portion and a first blocking portion, the first opening portion being a portion through which the first light and the second light are transmitted, the first blocking portion being a portion that blocks the first light and through which the second light is transmitted; and a second stop that is provided in the path of the incident light, and includes a second opening portion and a second blocking portion, the second opening portion being a portion through which the first light and the second light are transmitted, the second blocking portion being a portion that blocks the second light and through which the first light is transmitted, in which a stop controller separately changes a size of the first opening portion and a size of the second opening portion.

In order to achieve the object described above, a program according to an embodiment of the present technology is a program for controlling an image-capturing apparatus, the image-capturing apparatus including an imaging element that performs wavelength separation on incident light to obtain first light of a first wavelength and second light of a second wavelength, and photoelectrically converts the first light and the second light, the first light and the second light being included in the incident light; an optical element that collects light in the image-capturing apparatus; a first stop that is provided in a path of the incident light, and includes a first opening portion and a first blocking portion, the first opening portion being a portion through which the first light and the second light are transmitted, the first blocking portion being a portion that blocks the first light and through which the second light is transmitted; and a second stop that is provided in the path of the incident light, and includes a second opening portion and a second blocking portion, the second opening portion being a portion through which the first light and the second light are transmitted, the second blocking portion being a portion that blocks the second light and through which the first light is transmitted, in which the program controls the image-capturing apparatus as a stop controller that separately changes a size of the first opening portion and a size of the second opening portion.

Advantageous Effects of Invention

As described above, the present technology makes it possible to provide an image-capturing apparatus, an image-capturing method, and a program that are suitable to perform image-capturing with pieces of light of different wavelengths. Note that the effect described here is not necessarily limitative and may be any effect described in the present disclosure.

BRIEF DESCRIPTION OF DRAWINGS

FIG. 23 is a table in which an example of controlling the infrared stop and the visible light stop included in the image-capturing apparatus, is given.

FIG. 24 is a table in which an example of controlling the infrared stop and the visible light stop included in the image-capturing apparatus, is given.

FIGS. 30A, 30B, 30C, 30D, and 30E schematically illustrate various movable subjects in which the image-capturing apparatus can be installed.

An image-capturing apparatus according to an embodiment of the present technology will be described.

[Configuration of Image-Capturing Apparatus]

Figure 1:
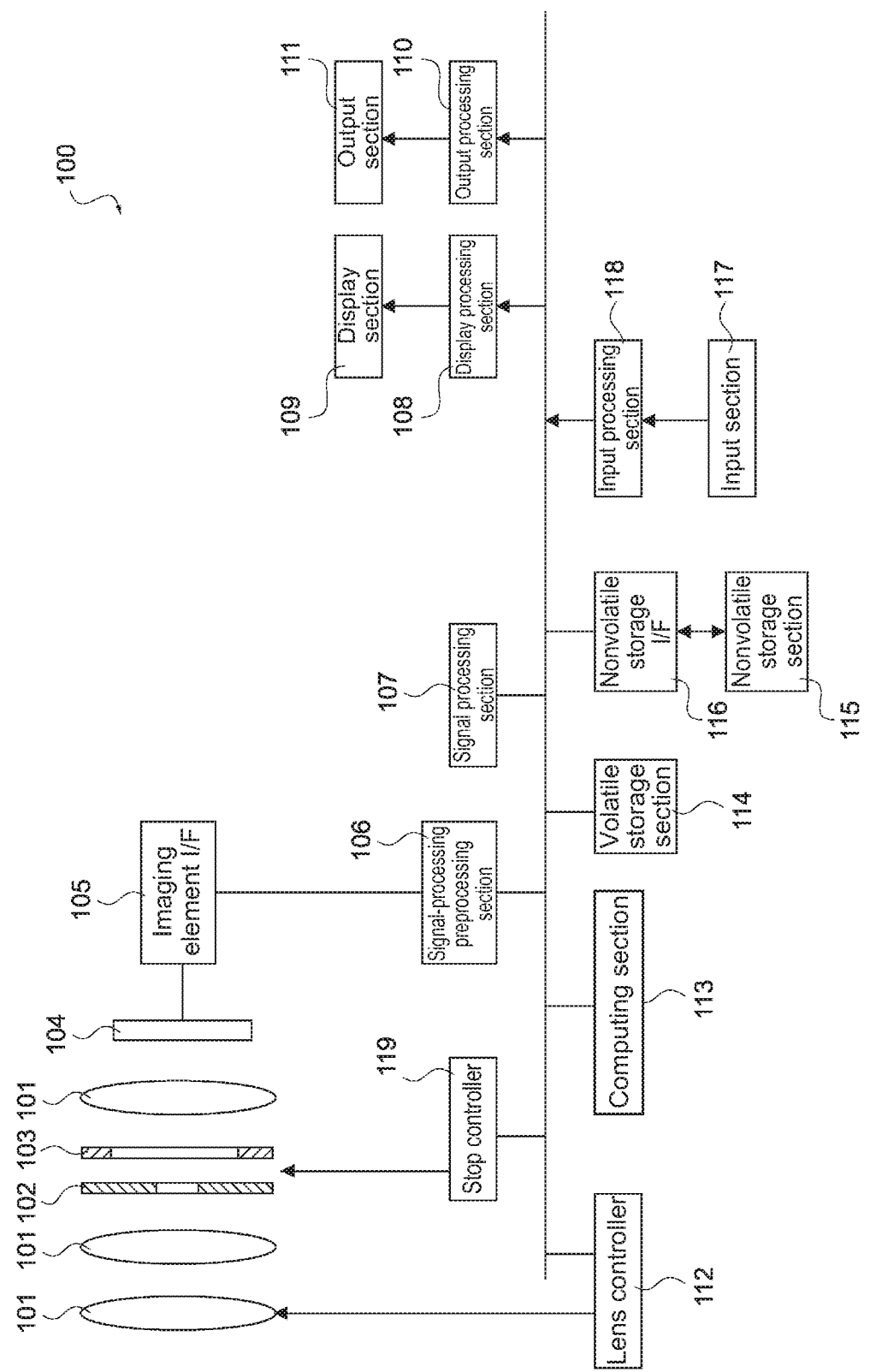
FIG. 1 is a block diagram of a configuration of an image-capturing apparatus according to an embodiment of the present technology.

FIG. 1 schematically illustrates an image-capturing apparatus 100 according to the present embodiment. As illustrated in the figure, the image-capturing apparatus 100 includes a lens 101, an infrared stop 102, a visible light stop 103, an imaging element 104, an imaging element interface (I/F) 105, a signal-processing preprocessing section 106, a signal processing section 107, a display processing section 108, a display section 109, an output processing section 110, an output section 111, a lens controller 112, a computing section 113, a volatile storage section 114, a nonvolatile storage section 115, a nonvolatile storage interface (I/F) 116, an input section 117, an input processing section 118, and a stop controller 119.

Figure 2:
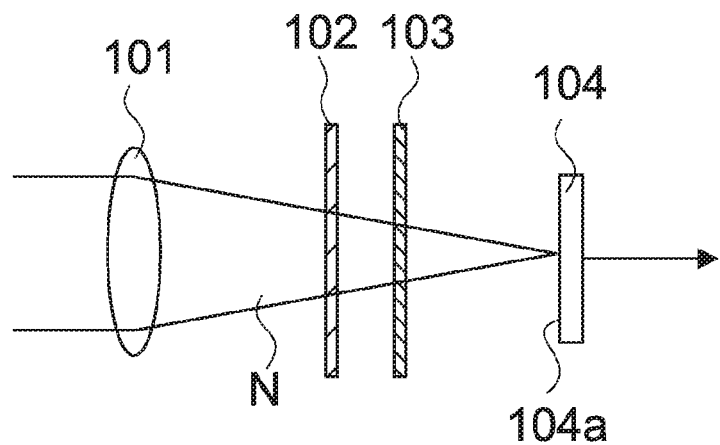
FIG. 2 schematically illustrates an optical system of the image-capturing apparatus.

The lens 101 collects incident light in the imaging element 104. FIG. 2 schematically illustrates light collection performed by the lens 101. As illustrated in the figure, incident light N is collected onto an image surface 104a of the imaging element 104 by the lens 101. The number of lenses 101 and the configuration of the lens 11 are not particularly limited, and it is sufficient if the number of lenses 101 and the configuration of the lens 11 make it possible to collect visible light and infrared light in the imaging element 104. The lens 101 can be moved in an optical-axis direction by a drive mechanism (not illustrated), and this results in adjusting a focal length.

Figure 3:
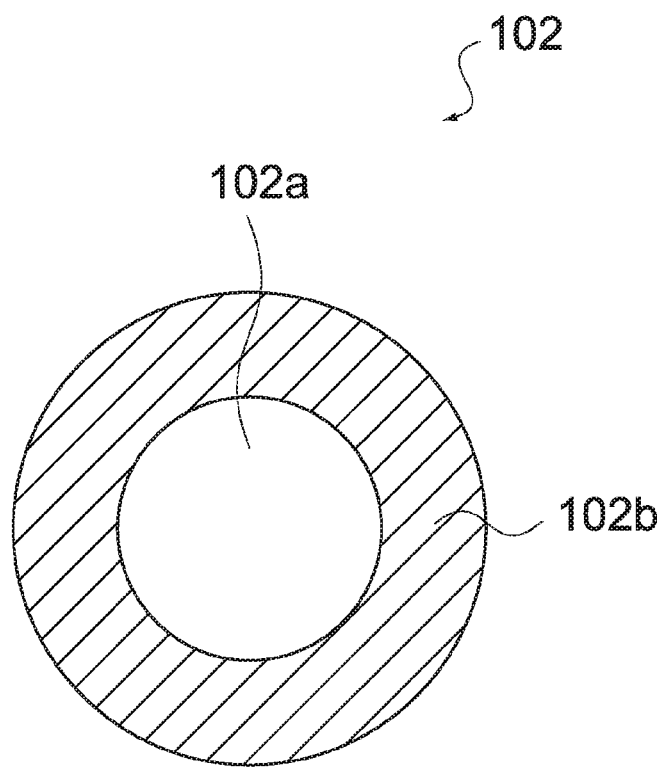
FIG. 3 schematically illustrates an infrared stop included in the image-capturing apparatus.

As illustrated in FIG. 2, the infrared stop 102 is provided in a path of the incident light N entering the lens 101, and blocks infrared light partially. FIG. 3 schematically illustrates the infrared stop 102, as viewed from the optical-axis direction. As illustrated in the figure, the infrared stop 102 includes an opening portion 102a and a blocking portion 102b.

Infrared light and visible light that are included in the incident light N are transmitted through the opening portion 102a. The blocking portion 102b is provided around the opening portion 102a, and the infrared light is blocked by the blocking portion 102b and the visible light is transmitted through the blocking portion 102b. The infrared stop 102 can adjust the size of the opening portion 102a by being controlled by the stop controller 119.

Figure 4:
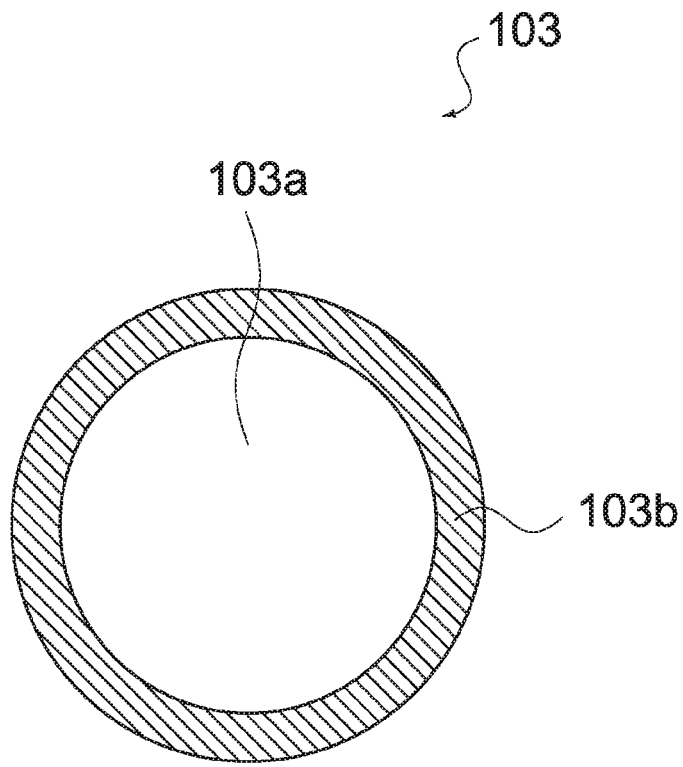
FIG. 4 schematically illustrates a visible light stop included in the image-capturing apparatus.

As illustrated in FIG. 2, the visible light stop 103 is provided in the path of incident light N entering the lens 101, and blocks visible light partially. FIG. 4 schematically illustrates the visible light stop 103, as viewed from the optical-axis direction. As illustrated in the figure, the visible light stop 103 includes an opening 103a and a blocking portion 103b.

Infrared light and visible light that are included in the incident light N are transmitted through the opening portion 103a. The blocking portion 103b is provided around the opening portion 103a, and the visible light is blocked by the blocking portion 103b and the infrared light is transmitted through the blocking portion 103b. The visible light stop 103 can adjust the size of the opening portion 103a by being controlled by the stop controller 119.

Figure 5:
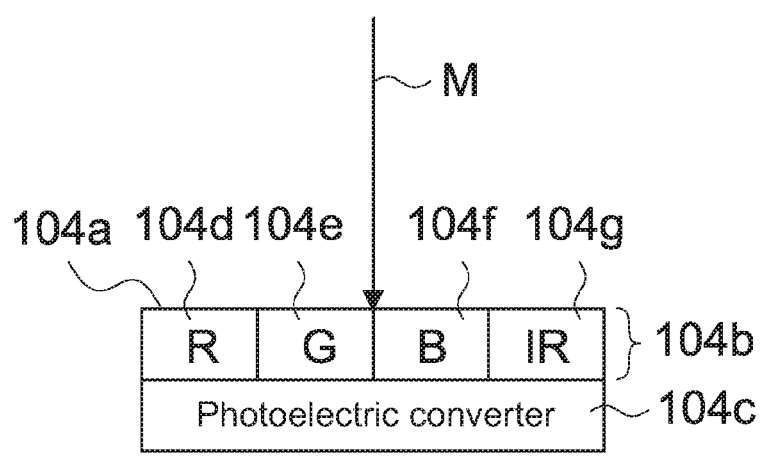
FIG. 5 schematically illustrates an imaging element included in the image-capturing apparatus.
Figure 6:
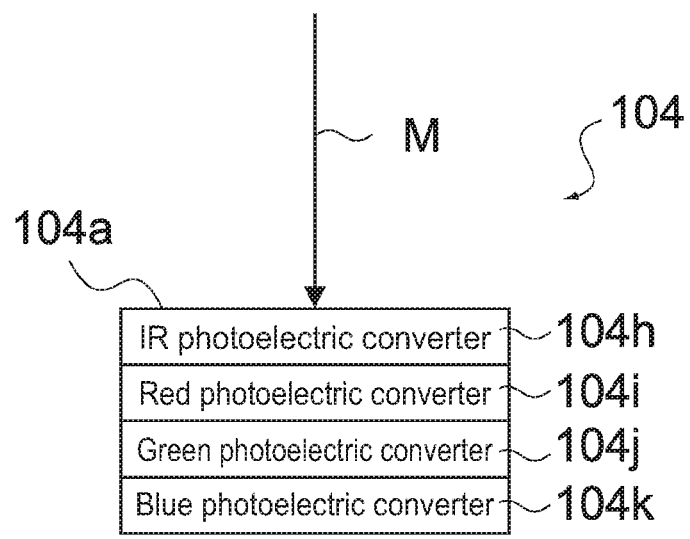
FIG. 6 schematically illustrates the imaging element included in the image-capturing apparatus.

The imaging element 104 performs wavelength separation on the incident light N to obtain visible light and infrared light that are included in the incident light N, photoelectrically changes each of the visible light and infrared light separately, and generates an image signal. FIGS. 5 and 6 each schematically illustrate a configuration of the imaging element 104.

As illustrated in FIG. 5, the imaging element 104 may have a configuration in which a wavelength separation filter 104b and a photoelectric converter 104c are stacked. The wavelength separation filter 104b includes a read color filter 104d, a green color filter 104e, a blue color filter 104f, and an infrared filter 104g that are arranged in a planar manner. The photoelectric converter 104c is an array of photoelectric conversion elements such as charge coupled devices (CCDs) or complementary metal oxide semiconductors (CMOSs). In this configuration, the imaging element 104 performs wavelength separation in a direction orthogonal to an optical axis M of the incident light N.

Further, as illustrated in FIG. 6, the imaging element 104 may also have a configuration in which photoelectric change portions that correspond to respective wavelengths are stacked. In this configuration, the imaging element 104 includes a photoelectric converter 104h that photoelectrically converts infrared light, a photoelectric converter 104i that photoelectrically converts red light, a photoelectric converter 104j that photoelectrically converts green light, and a photoelectric converter 104k that photoelectrically changes blue light. Each photoelectric converter includes a wavelength separation filter and an array of photoelectric conversion elements. In this configuration, the imaging element 104 performs wavelength separation in a direction parallel to the optical axis M, using the fact that the incident light N reaches a different depth depending on a wavelength.

Furthermore, the imaging element 104 may be configured to perform wavelength separation in both of the directions orthogonal to the optical axis M and parallel to the optical axis M. The imaging element 104 provides the generated image signal to the imaging element I/F 105. The imaging element I/F 105 provides the image signal provided by the imaging element 104 to the signal-processing preprocessing section 106.

The signal-processing preprocessing section 106 performs preprocessing on the image signal such as noise reduction, and outputs the image signal to the signal processing section 107.

The signal processing section 107 converts the image signal into an image (develops an image using the image signal), provides the generated image to the display section 109 through the display processing section 108, and causes the image to be displayed on the display section 109. Further, as described later, the signal processing section 107 calculates a distance to a subject using the image, provides the calculated distance to a subject to the output section 111 through the output processing section 110, and outputs the calculated distance to a subject to an external device. Furthermore, the signal processing section 107 provides the calculated distance to a subject to the lens controller 112.

The lens controller 112 controls the lens 101 using the distance to a subject that is provided by the signal processing section 107, and performs focusing.

The volatile storage section 114 temporarily stores therein information, and provides the information to the computing section 113. The nonvolatile storage section 115 stores therein the information, and provides the information to the computing section 113 through the nonvolatile storage I/F 116.

The input section 117 generates an operation signal when an operation input is performed on the input section 117 by a user, and provides the generated operation signal to the input processing section 118. The input processing section 118 outputs the operation signal provided by the input section 117 to the computing section 113.

The stop controller 119 separately controls apertures of the infrared stop 102 and the visible light stop 103, that is, the sizes of the opening portion 102a and the opening portion 103a. This will be described in detail later.

In order to control each of the processes described above, the computing section 113 controls each section using information stored in the volatile storage section 114, information stored in the nonvolatile storage section 115, and information input to the input section 117. Further, the computing section 113 controls the stop controller 119 according to the amount of the incident light N entering the imaging element 104.

[Functional Configuration of Image-Capturing Apparatus]

Figure 7:
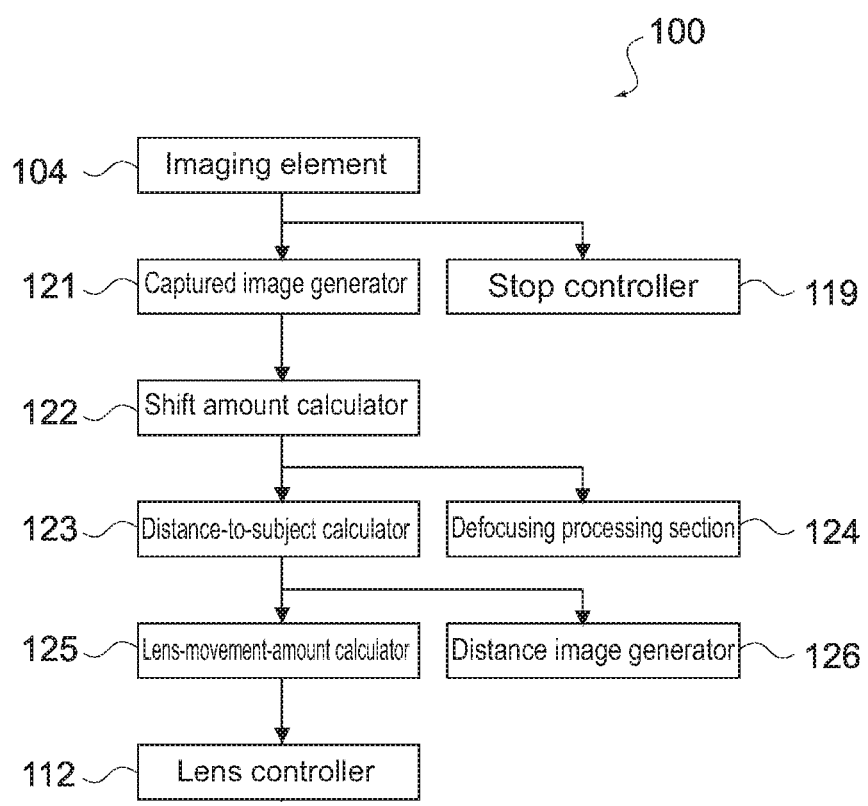
FIG. 7 is a block diagram of a functional configuration of the image-capturing apparatus.

FIG. 7 is a block diagram of a functional configuration of the image-capturing apparatus 100. As illustrated in the figure, the image-capturing apparatus 100 includes, as a functional configuration, a captured image generator 121, a shift amount calculator 122, a distance-to-subject calculator 123, a defocusing processing section 124, a lens-movement-amount calculator 125, and a distance image generator. This functional configuration can be provided by hardware and software of the image-capturing apparatus 100 cooperating with each other.

The captured image generator 121 generates a captured image using an output signal from the imaging element 104. The captured image generator 121 is implemented by the imaging element interface (I/F) 105, the signal-processing preprocessing section 106, and the signal processing section 107. The captured image generator 121 provides the generated captured image to the shift amount calculator 122.

As described later, the shift amount calculator 122 calculates an amount of a shift between a subject image captured with visible light and a subject image captured with infrared light, the subject images being included in a captured image. The shift amount calculator 122 is implemented by the signal processing section 107. The shift amount calculator 122 provides the detected shift amount to the distance-to-subject calculator 123 and the defocusing processing section 124.

The distance-to-subject calculator 123 calculates a distance between the image-capturing apparatus 100 and a subject (hereinafter referred to as a distance to a subject) using the shift amount provided by the shift amount calculator 122. The distance-to-subject calculator 123 is implemented by the signal processing section 107. The distance-to-subject calculator 123 provides the calculated distance to a subject to the lens-movement-amount calculator 125 and the distance image generator 126.

The defocusing processing section 124 performs defocusing processing using the shift amount provided by the shift amount calculator 122. The defocusing processing section 124 is implemented by the computing section 113 or the signal processing section 107. The defocusing processing section 124 causes an image on which defocusing processing has been performed to be stored in the nonvolatile storage section 115, or to be displayed on the display section 109.

The lens-movement-amount calculator 125 calculates a lens-movement amount using the distance to a subject provided by the distance-to-subject calculator 123 and a focal length of the image-capturing apparatus 100. The lens-movement-amount calculator 125 is implemented by the computing section 113 or the signal processing section 107. The lens-movement-amount calculator 125 provides the calculated lens-movement amount to the lens controller 112.

The distance image generator 126 visualizes, into an image, the distance to a subject provided by the distance-to-subject calculator 123, and generates a distance image. The distance image generator 126 is implemented by the computing section 113 or the signal processing section 107. The distance image generator 126 causes the generated distance image to be stored in the nonvolatile storage section 115, or to be displayed on the display section 109.

The image-capturing apparatus 100 has the functional configuration described above. Note that the image-capturing apparatus 100 may only include a portion of the functional configuration described above. Further, the lens controller 112 and the stop controller 119 described above may also be provided by the hardware and the software of the image-capturing apparatus 100 cooperating with each other.

[Infrared Stop and Visible Light Stop]

The infrared stop 102 and the visible light stop 103 are described while comparing them with a conventional light-amount adjusting mechanism.

Figure 8:
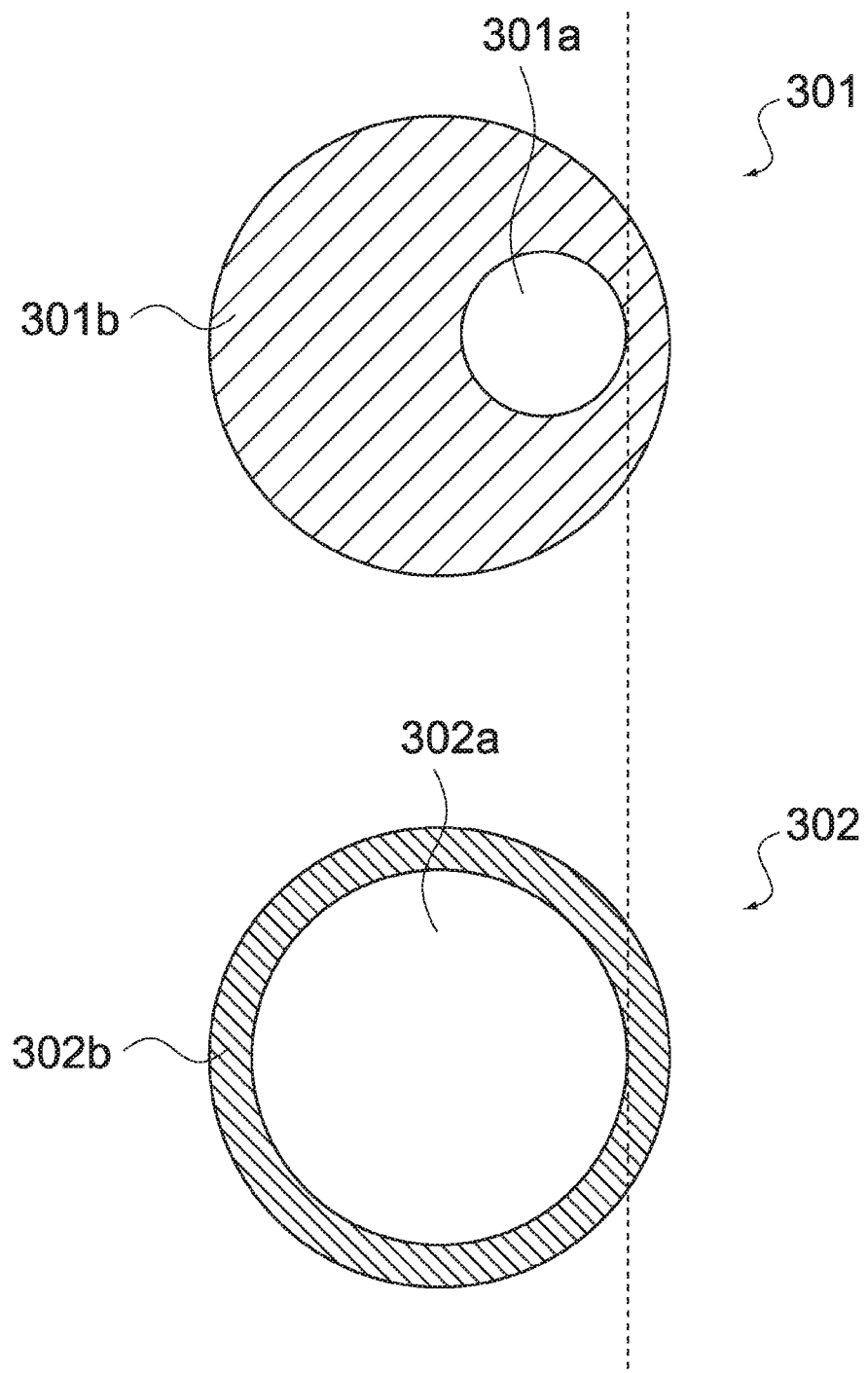
FIG. 8 schematically illustrates a structured opening and a visible light stop that are included in an image-capturing apparatus having a conventional structure.

FIG. 8 schematically illustrates a conventional structured opening 301 for infrared light and a conventional visible light stop 302. The structured opening 301 includes an opening portion 301a and a blocking portion 301b, and the visible light stop 302 includes an opening portion 302a and a blocking portion 302b.

In this configuration, the blocking portion 302b of the visible light stop 302 is not allowed to be situated inwardly beyond the periphery (indicated by a dotted line in the figure) of the opening portion 301a of the structured opening 301, in order to prevent the blocking portion 302b from covering the opening portion 301a. Thus, the visible light stop 302 is not allowed to have an opening diameter having a value not greater than a certain value.

Figure 9A:
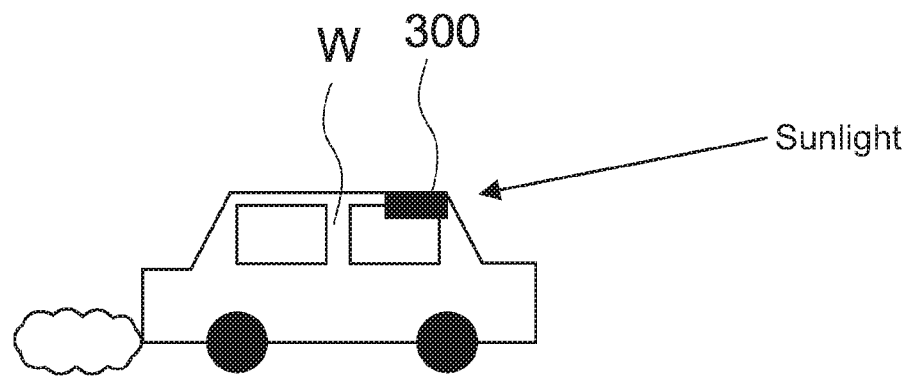
FIGS. 9A and 9B schematically illustrate a state in which the image-capturing apparatus having the conventional structure is used.
Figure 9B:
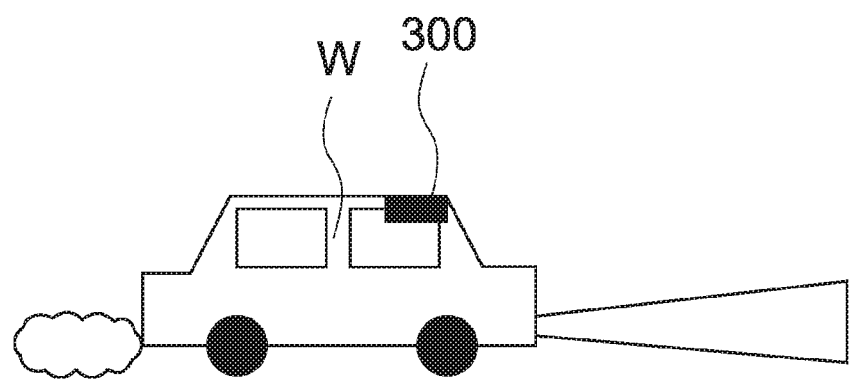
Figure 10A:
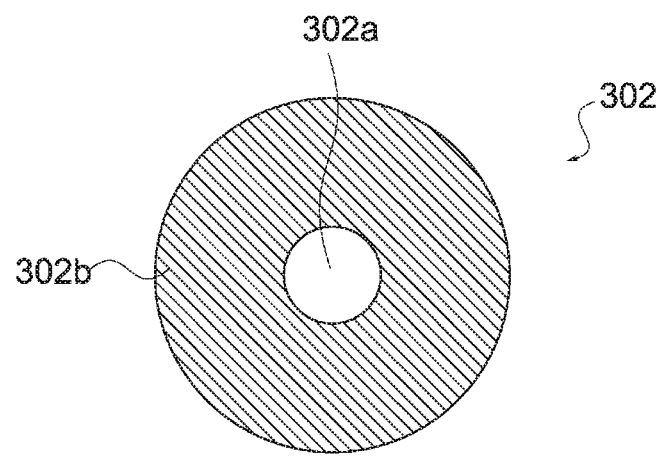
FIGS. 10A and 10B schematically illustrate the visible light stop included in the image-capturing apparatus having the conventional structure.
Figure 10B:
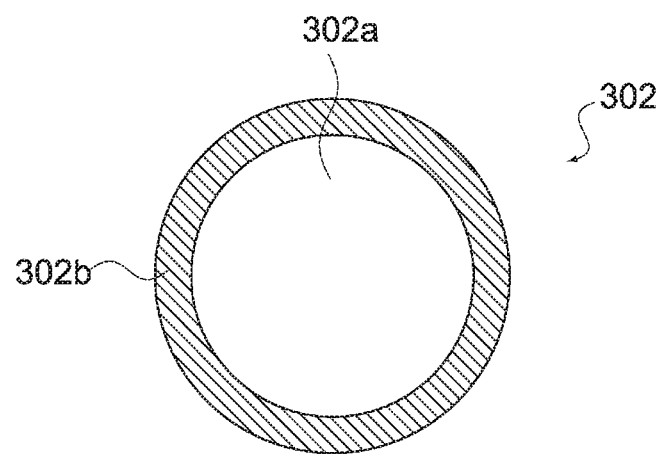

FIGS. 9A and 9B schematically illustrate a vehicle W equipped with an image-capturing apparatus 300 that includes the structured opening 301 and the visible light stop 302, and FIG. 10A and 1B are schematic diagrams for explaining an adjustment of the visible light stop 302. When the vehicle W is traveling toward the sunlight as illustrated in FIG. 9A, there is a need to make the visible light stop 302 small as illustrated in FIG. 10A to reduce the amount of light. Further, when the vehicle W is traveling at night or in a tunnel as illustrated in FIG. 9B, there is a need to open the visible light stop 302 as illustrated in FIG. 10B to increase the amount of light.

However, as described above, the visible light stop 302 is not allowed to have an opening diameter having a value not greater than a certain value, and thus it is difficult to use the image-capturing apparatus 300 outdoors in particular.

Figure 11A:
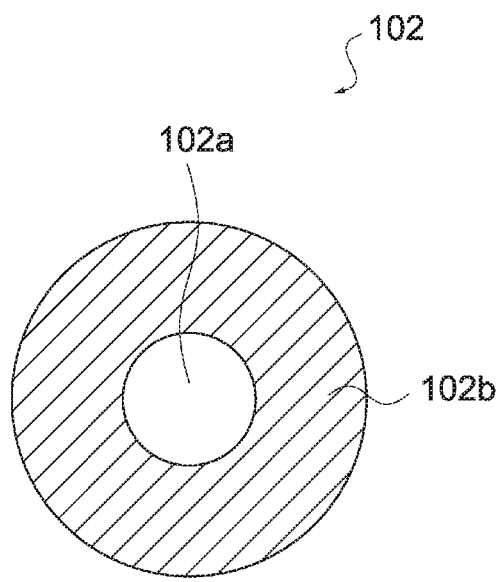
FIGS. 11A and 11B schematically illustrate the infrared stop and the visible light stop included in the image-capturing apparatus according to the embodiment of the present technology.
Figure 11B:
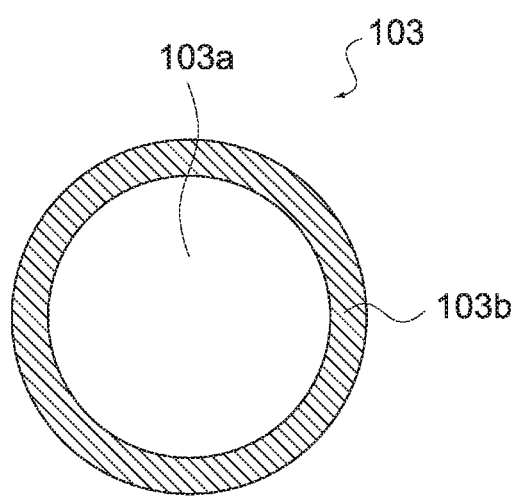
Figure 12A:
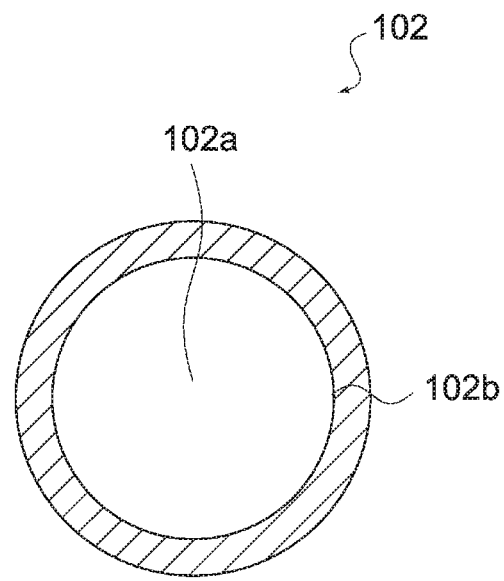
FIGS. 12A and 12B schematically illustrate the infrared stop and the visible light stop included in the image-capturing apparatus.
Figure 12B:
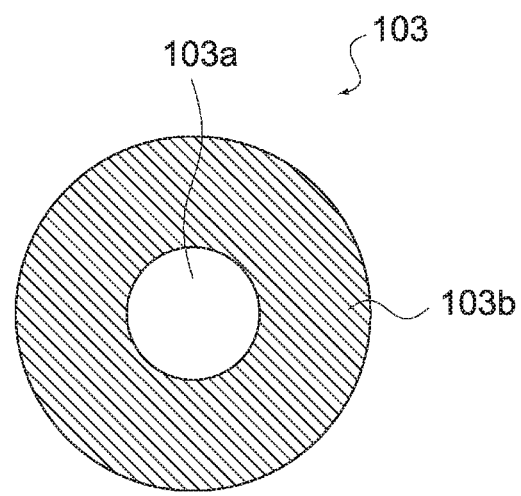

FIGS. 11A, 11B, 12A, and 12B are schematic diagrams for explaining an adjustment of the infrared stop 102 and the visible light stop 103 according to the present embodiment. When the amount of infrared light is large, the stop controller 119 can make the infrared stop 102 small as illustrated in FIG. 11A, and open the visible light stop 103 as illustrated in FIG. 11B. Further, when the amount of visible light is large, the stop controller 119 can open the infrared stop 102 as illustrated in FIG. 12A, and make the visible light stop 103 small as illustrated of FIG. 12B.

As described above, the image-capturing apparatus 100 according to the present embodiment makes it easy to perform image-capturing in various environments of different amounts of light, since the opening diameter of the infrared stop 102 and the opening diameter of the visible light stop 103 can be separately adjusted.

[Position of Center of Opening Portion of Stop]

In the image-capturing apparatus 100, a distance to a subject can be calculated by shifting the center of the opening portion 102a of the infrared stop 102 (hereinafter referred to as an infrared-opening-portion center P1) from the center of the opening portion 103a of the visible light stop 103 (hereinafter referred to as a visible-light-opening-portion center P2).

Figure 13A:
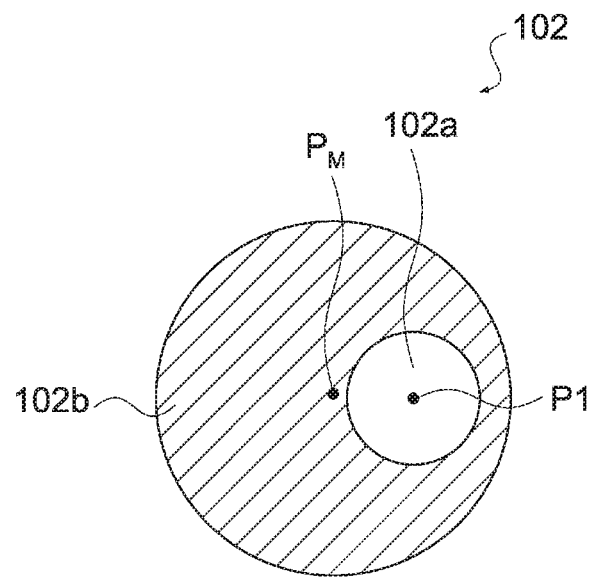
FIGS. 13A and 13B schematically illustrate the infrared stop and the visible light stop included in the image-capturing apparatus.
Figure 13B:
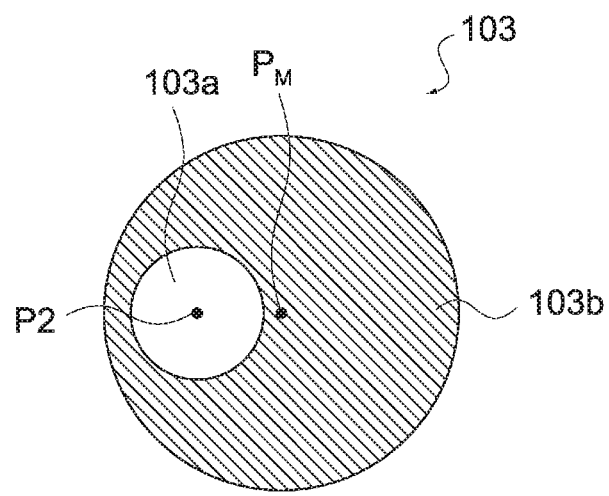

FIGS. 13A and 13B schematically illustrate a shift between the infrared-opening-portion center P1 and the visible-light-opening-portion center P2 when the infrared stop 102 and the visible light stop 103 are viewed from the direction parallel to the optical axis M (hereinafter referred to as the optical-axis direction). As illustrated in the figure, the infrared-opening-portion center P1 and the visible-light-opening-portion center P2 are both shifted from a center $P_M$ of the optical axis M in a direction orthogonal to the optical-axis direction.

Figure 14A:
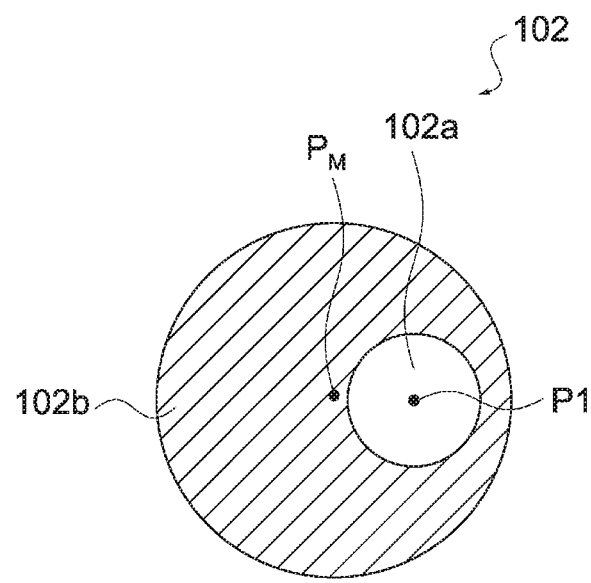
FIGS. 14A and 14B schematically illustrate the infrared stop and the visible light stop included in the image-capturing apparatus.
Figure 14B:
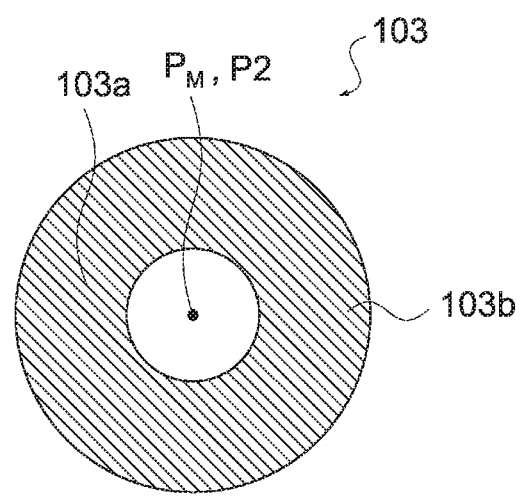

Further, at least one of the infrared-opening-portion center P1 or the visible-light-opening-portion center P2 may be shifted from the center $P_M$. FIGS. 14A and 14B schematically illustrate a shift between the infrared-opening-portion center P1 and the visible-light-opening-portion center P2. The infrared-opening-portion center P1 may be shifted from the center $P_M$, and the visible-light-opening-portion center P2 may coincide with the center $P_M$, as illustrated in the figure.

Figure 15A:
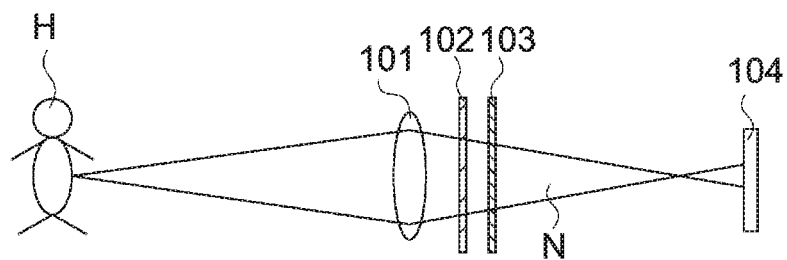
FIGS. 15A and 15B schematically illustrate a path of incident light in the image-capturing apparatus.
Figure 15B:
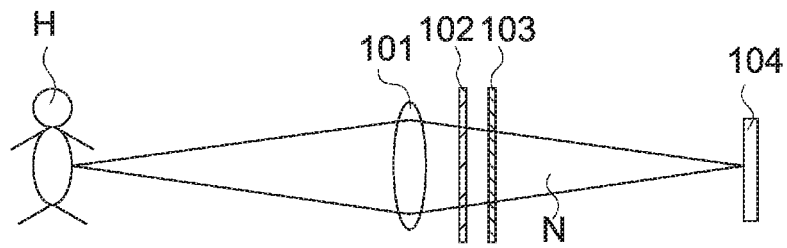
Figure 16A:
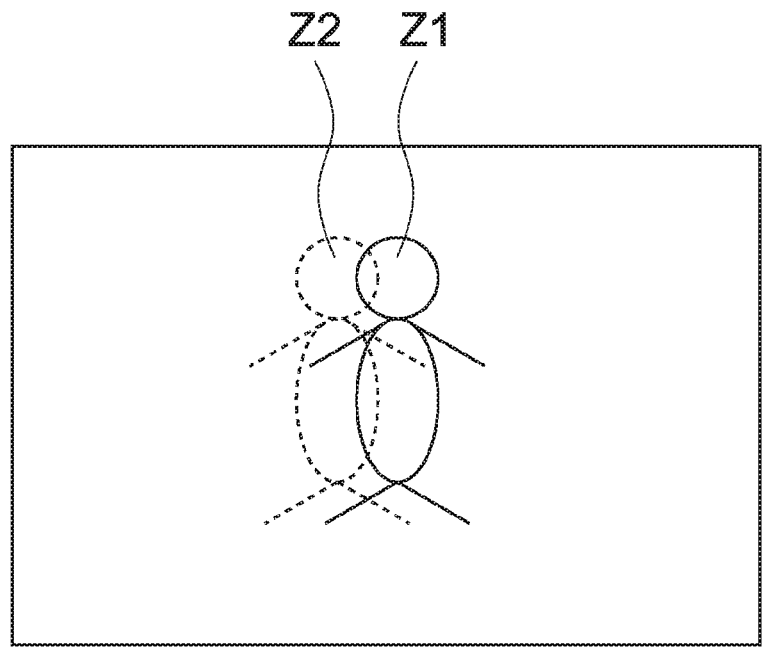
FIGS. 16A and 16B illustrate examples of images captured by the imaging element in the image-capturing apparatus.
Figure 16B:
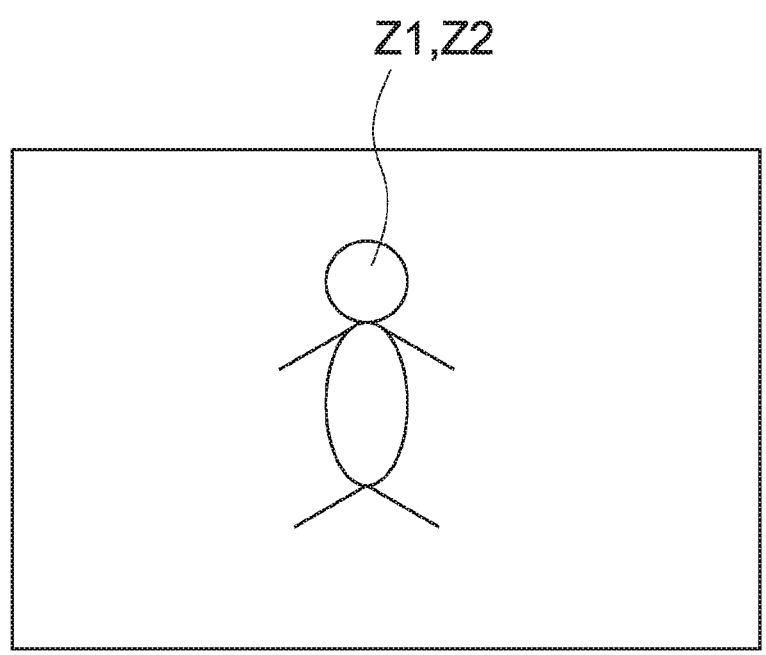

FIGS. 15A and 15B schematically illustrates a distance to a subject and the incident light N, and FIGS. 16A and 16B schematically illustrates an image captured by the imaging element 104 (hereinafter referred to as a captured image). Focus is determined according to a distance to a subject and a focal length of the lens 101. Thus, the position of an image is determined according to the distance to a subject when the focal length is constant. When the image-capturing apparatus 100 is not focused on a subject H, as illustrated in FIG. 15A, light reaches different positions in the imaging element 104 depending on the position, in the lens 101, through which the light passes. Thus, as illustrated in FIG. 16A, a subject image Z1 captured with visible light and a subject image Z2 captured with infrared light are shifted from each other in a captured image.

On the other hand, when the image-capturing apparatus 100 is focused on the subject H, as illustrated of FIG. 15B, the position reached by the light in the imaging element 104 remains unchanged due to the position, in the lens 101, through which the light passes, and thus the subject image Z1 and the subject image Z2 coincide with each other in the captured image, as illustrated in FIG. 16B.

The shift amount calculator 122 can detect the subject image Z1 and the subject image Z2 using an arbitrary object recognition algorithm, and calculate an amount of a shift between the subject image Z1 and the subject image Z2. The distance-to-subject calculator 123 can calculate a distance to a subject using the focal length of the lens 101 and the shift amount since the focal length is known in the image-capturing apparatus 100.

Figure 17:
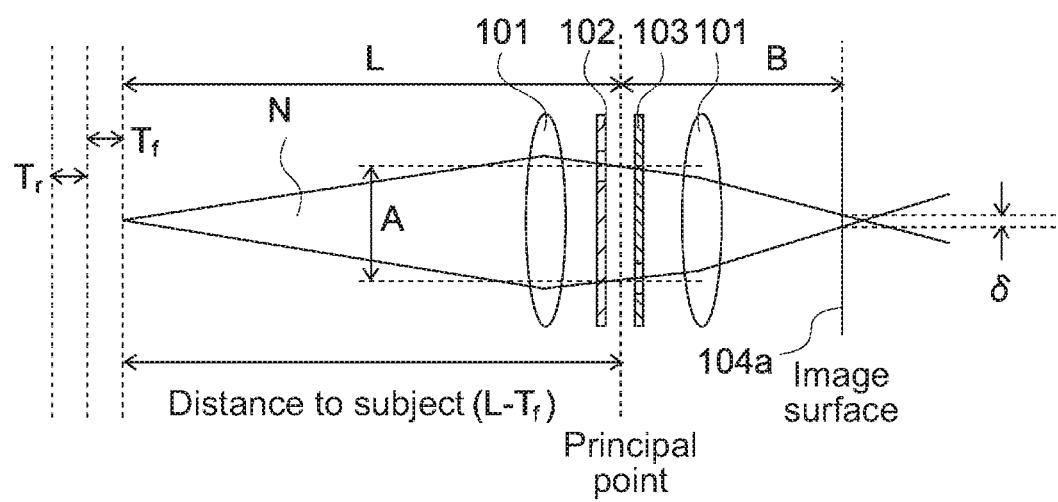
FIG. 17 is a schematic diagram for explaining a method for calculating a distance to a subject that is performed by the image-capturing apparatus.

FIG. 17 is a schematic diagram for explaining values related to a calculation of a distance to a subject. As illustrated in the figure, δ is an amount of a shift between the subject image Z1 and the subject image Z2, A is a distance between stops on a principal point (a distance between the infrared-opening-portion center P1 and the visible-light-opening-portion center P2 in a direction orthogonal to the optical axis), and B is a distance from the principal point to the image surface 104a. Further, f is a focal length of a lens.

Figure 18A:
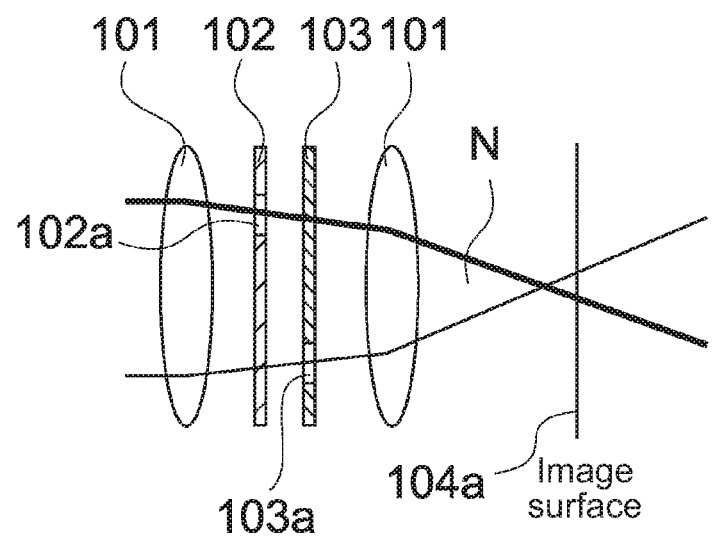
FIGS. 18A and 18B are schematic diagrams for explaining the method for calculating a distance to a subject that is performed by the image-capturing apparatus.

(Formula 1) indicated below holds when light passes through the opening portion 102a (in the upper portion in the figure) of the infrared stop 102, and forms an image in a lower portion of the image surface 104a, where the direction of a shift is different from the direction of a stop position, as illustrated in FIG. 18A.

[Formula 1]

$$T_r = \frac{\delta F L^2}{f^2 - \delta F L} \quad \text{(Formula 1)}$$

Figure 18B:
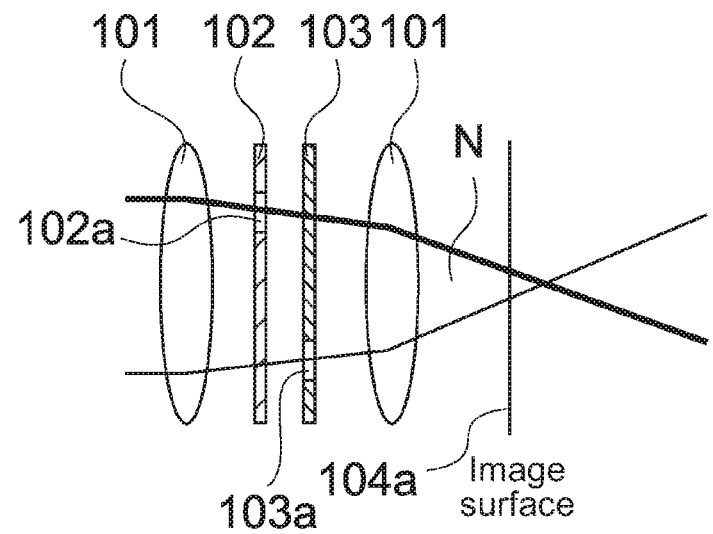

Further, (Formula 2) indicated below holds when light passes through the opening portion 102a (in the upper portion in the figure) of the infrared stop 102, and forms an image in an upper portion of the image surface 104a, where the direction of a shift is the same as the direction of a stop position, as illustrated in FIG. 18B.

[Formula 2]

$$T_f = \frac{\delta F L^2}{f^2 + \delta F L} \quad \text{(Formula 2)}$$

where $$L = \frac{fB}{B - f} \quad \text{(Formula 3)}$$

$$F = \frac{f}{A} \quad \text{(Formula 4)}$$

The distance-to-subject calculator 123 can calculate a distance to a subject by calculating L and Tf or Tr by use of (Formula 1) and (Formula 2).

[Center of Opening Portion of Stop]

Figure 19:
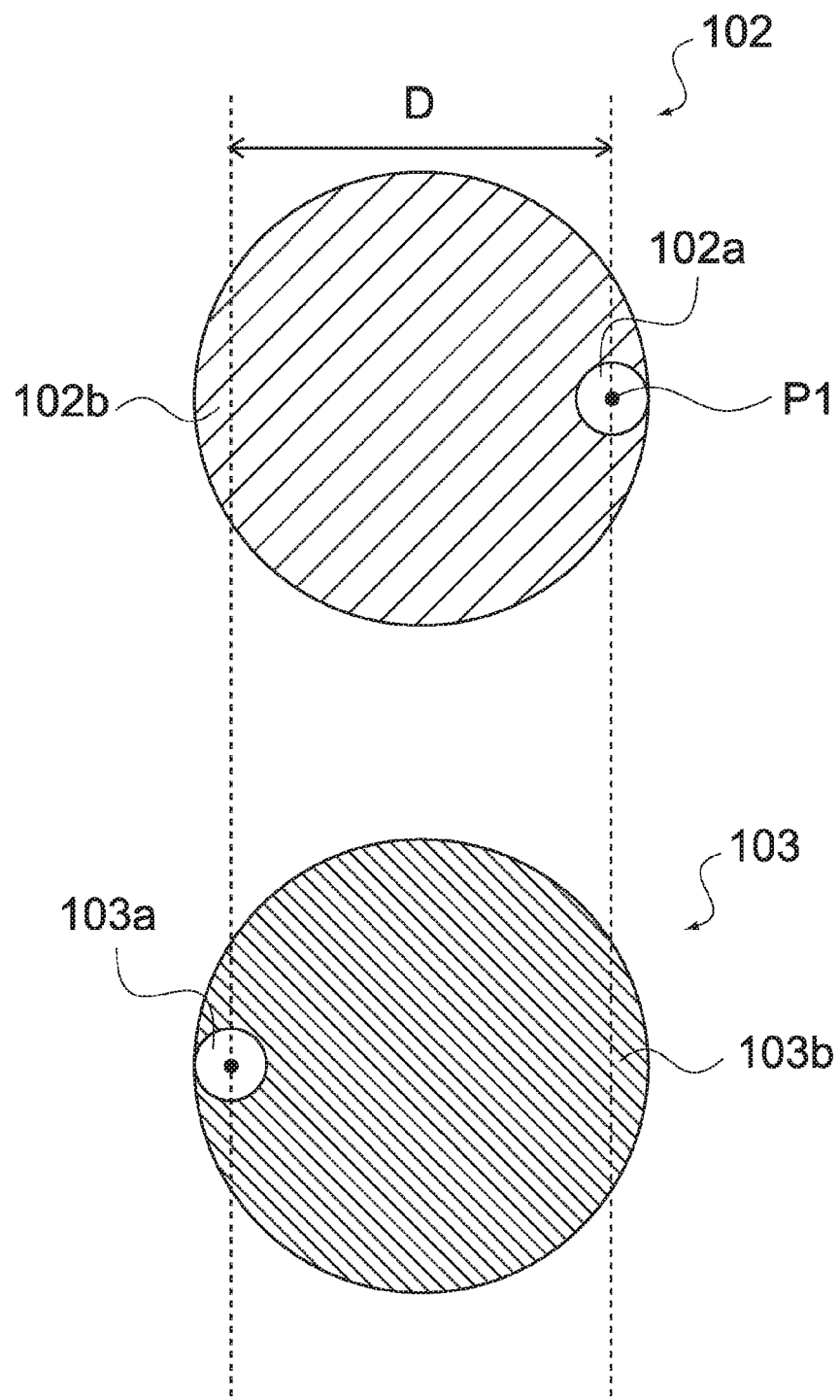
FIG. 19 schematically illustrates the infrared stop and the visible light stop included in the image-capturing apparatus.
Figure 20:
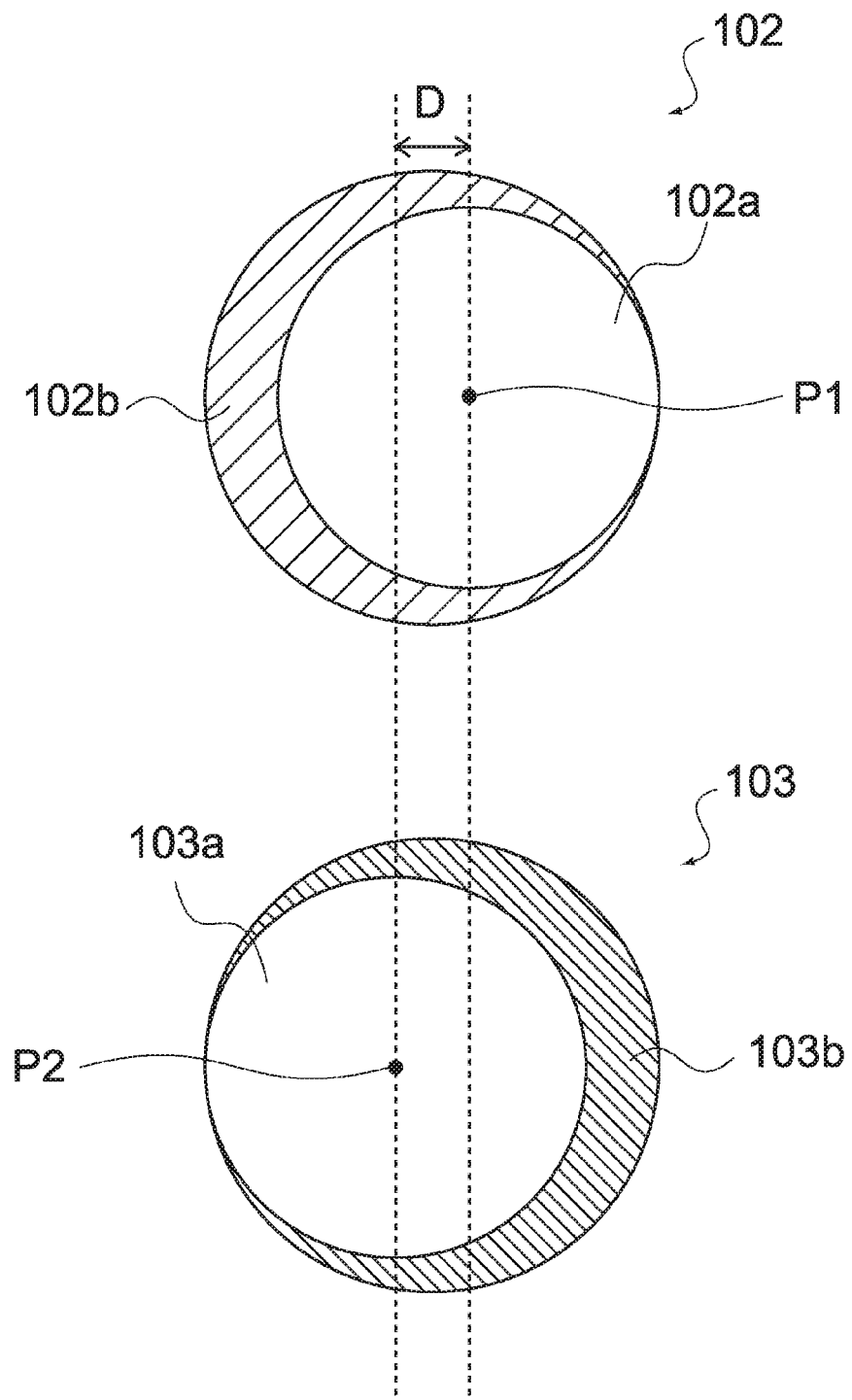
FIG. 20 schematically illustrates the infrared stop and the visible light stop included in the image-capturing apparatus.

The centers of the opening portions of the infrared stop 102 and the visible light stop 103 may be changed according to a movement speed of the image-capturing apparatus 100 and an amount of light entering the imaging element 104. FIGS. 19 and 20 schematically illustrate changes in the centers of the openings.

When the movement speed of the image-capturing apparatus 100 is slow, or when the amount of the incident light N is large, a distance D between the infrared-opening-portion center P1 and the visible-light-opening-portion center P2 can be made large by making the infrared stop 102 and the visible light stop 103 small, as illustrated in FIG. 19. This makes the amount of a shift between the subject image Z1 and the subject image Z2 large, which results in improving the accuracy in a calculation of a distance to a subject.

Further, when the movement speed of the image-capturing apparatus 100 is high, or when the amount of the incident light N is small, the distance D between the infrared-opening-portion center P1 and the visible-light-opening-portion center P2 is made small by opening the infrared stop 102 and the visible light stop 103, as illustrated in FIG. 20.

Figure 21:
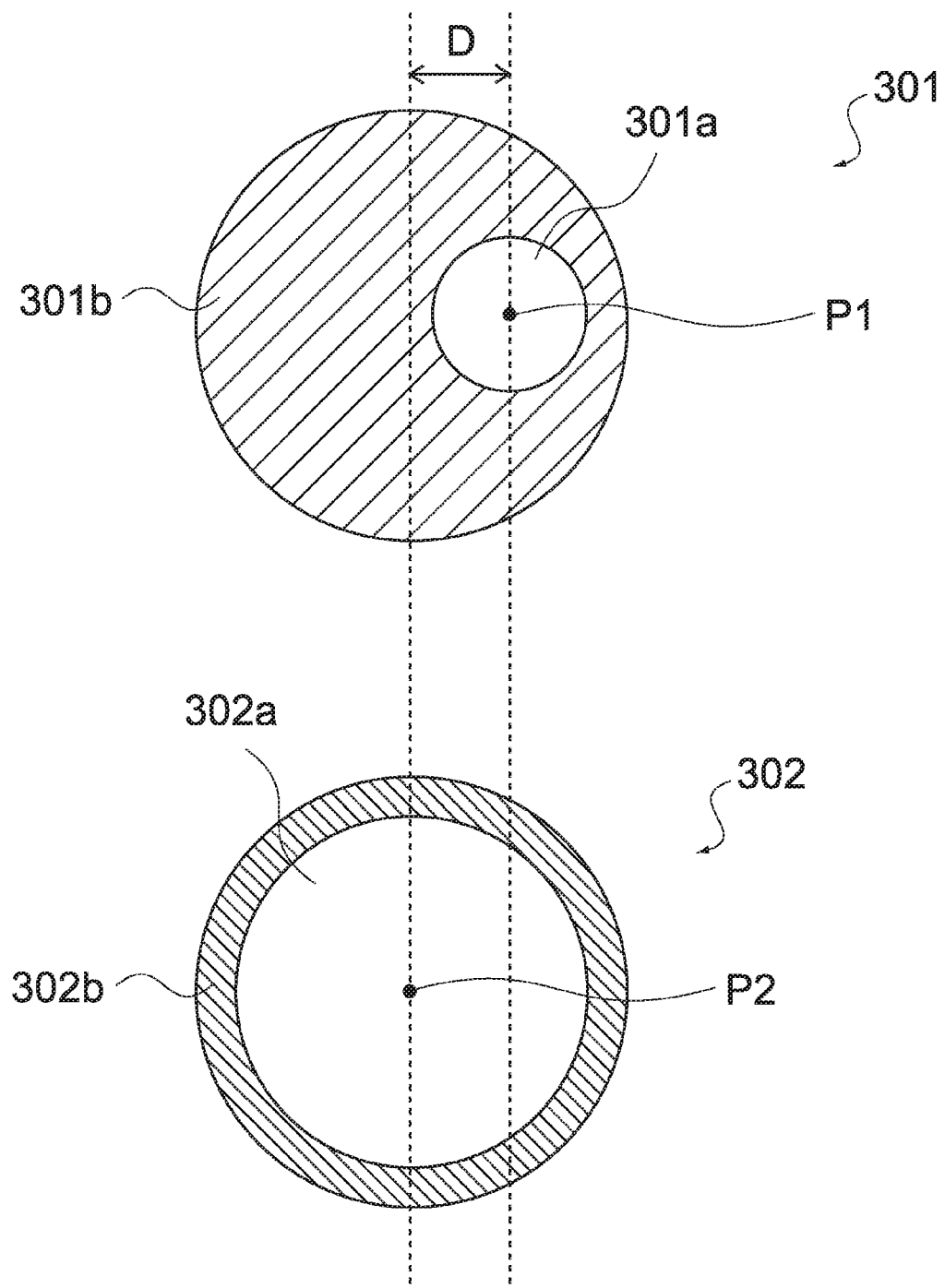
FIG. 21 schematically illustrates the structured opening and the visible light stop included in the image-capturing apparatus having the conventional structure.

On the other hand, as illustrated in FIG. 21, when the movement speed is high or the amount of incident light is small in an image-capturing apparatus having a conventional structure, a dark infrared image is obtained, and it is not possible to acquire a shift between subject images due to blur caused by a subject. When the movement speed of the image-capturing apparatus is slow or the amount of the incident light is large, it is not possible to acquire a shift due to blown-out highlights, or the shift is small. This results in a low accuracy in a calculation of a distance to the subject even if the distance to the subject is calculated.

Figure 22:
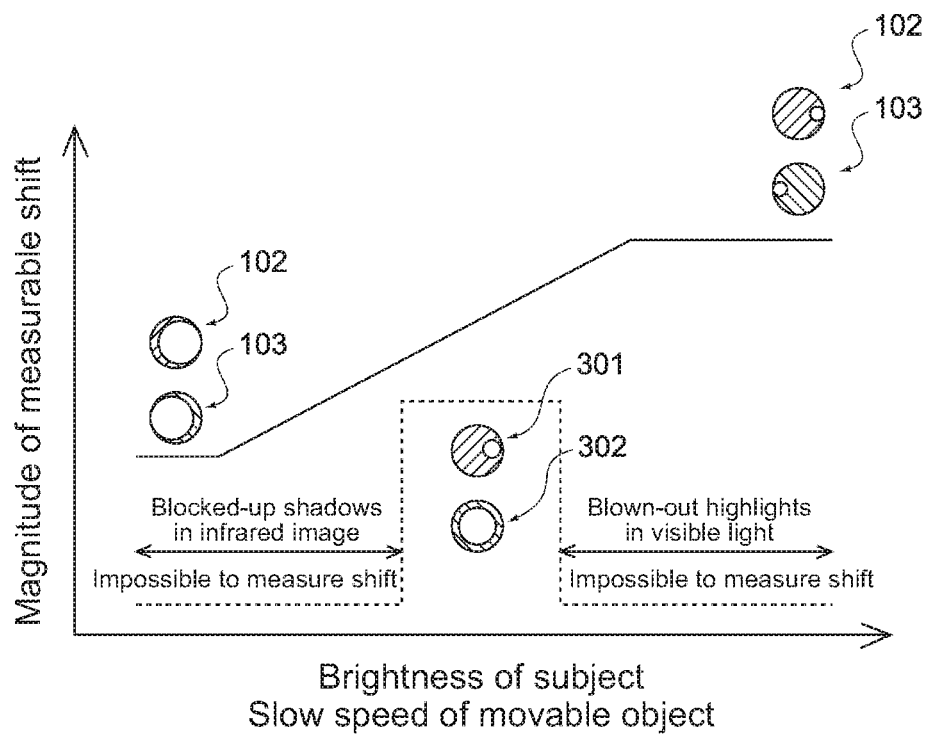
FIG. 22 is a graph illustrating magnitudes of shifts that can be measured by the image-capturing apparatus according to the embodiment of the present technology and the image-capturing apparatus having the conventional structure.

FIG. 22 is a graph illustrating a relationship between an amount of incident light or a movement speed, and a magnitude of a measurable shift. As illustrated in the figure, the structure according to the present embodiment (indicated by a solid line in the figure) makes it possible to measure a shift even if there is a change in an amount of incident light or in a movement speed, since blown-out highlights or blocked-up shadows are less likely to occur due to a greater flexibility in stops. On the other hand, the range in which a shift can be measured is relatively narrow in the conventional structure (indicated by a broken line in the figure).

FIG. 23 is a table in which states of the infrared stop 102 and the visible light stop 103 in order to perform an optimal exposure, are given. An appropriate exposure can be performed by separately adjusting the infrared stop 102 and the visible light stop 103, since the reflectance of infrared light differs depending on a subject.

FIG. 24 is a table in which states of the infrared stop 102 and the visible light stop 103 in order to optimally measure a distance to a subject, are given. The distance range suitable for measurement is changed, since a distance between the infrared-opening-portion center P1 and the visible-light-opening-portion center P2 in the direction orthogonal to the optical axis, can be changed according to the opening level of a stop.

[Focusing Control]

When the image-capturing apparatus 100 calculates a distance to a subject as described above, the image-capturing apparatus 100 can control the focus of the image-capturing apparatus 100 using the calculated distance to a subject.

Figure 25:
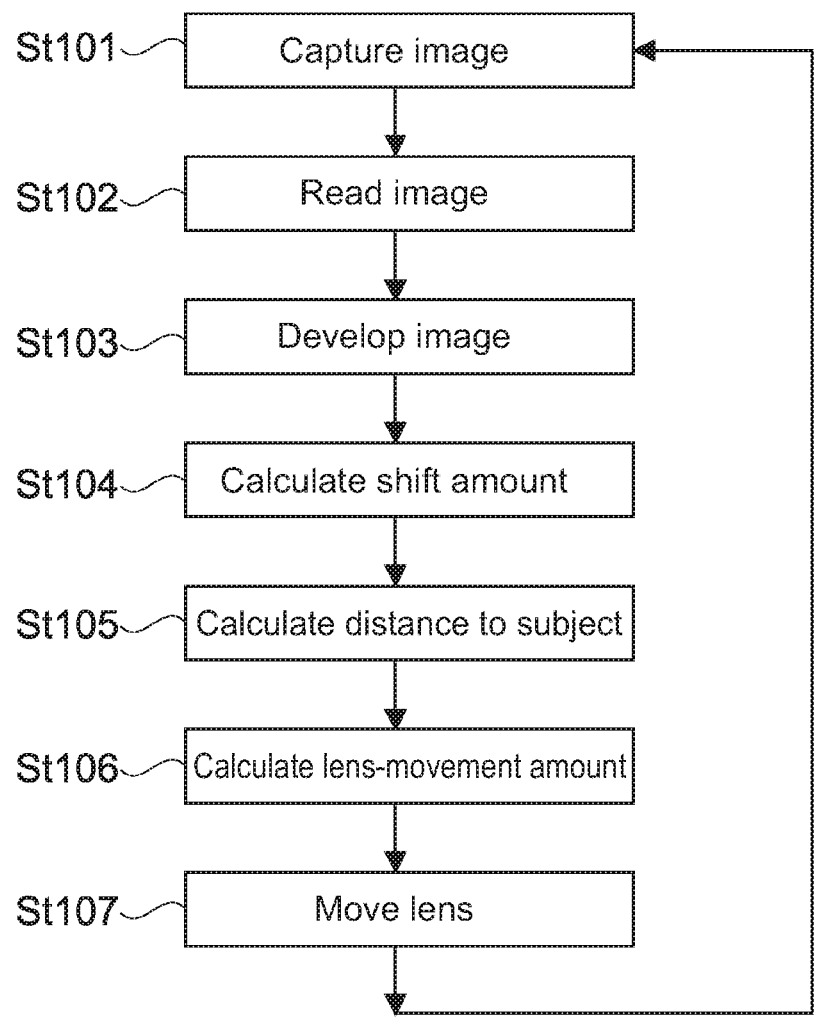
FIG. 25 is a flowchart of a focusing operation of the image-capturing apparatus.

FIG. 25 is a flowchart of an operation of a focusing control performed by the image-capturing apparatus 100. When the imaging element 104 captures an image (St101), the captured image generator 121 generates a captured image. In other words, the imaging element I/F 105 reads an image signal from the imaging element 104 (St102), and provides the image signal to the signal-processing preprocessing section 106.

The signal-processing preprocessing section 106 and the signal processing section 107 develop the read image (St103). The shift amount calculator 122 detects a subject image Z1 and a subject image Z2 in the captured image, and calculates an amount of a shift between the subject image Z1 and the subject image Z2 (St104).

The distance-to-subject calculator 123 calculates a distance to a subject using the shift amount (St105), and provides the calculated distance to a subject to the lens-movement-amount calculator 125. The lens-movement-amount calculator 125 calculates, using the distance to a subject and a focal length, a lens-movement amount that is used to cause the image-capturing apparatus 100 to be focused on a subject (St106), and provides the calculated lens-movement amount to the lens controller 112.

The lens controller 112 moves the lens 101 according to the lens-movement amount provided by the computing section 113 (St107). After that, when an image is captured, the image-capturing apparatus 100 repeatedly performs the steps described above. The image-capturing apparatus 100 can perform a focusing control, as described above.

[Acquisition of Distance Image]

The image-capturing apparatus 100 can also generate a distance image using a calculated distance to a subject. The distance image is an image indicating a distance to a subject using, for example, brightness, color, or shading.

Figure 26:
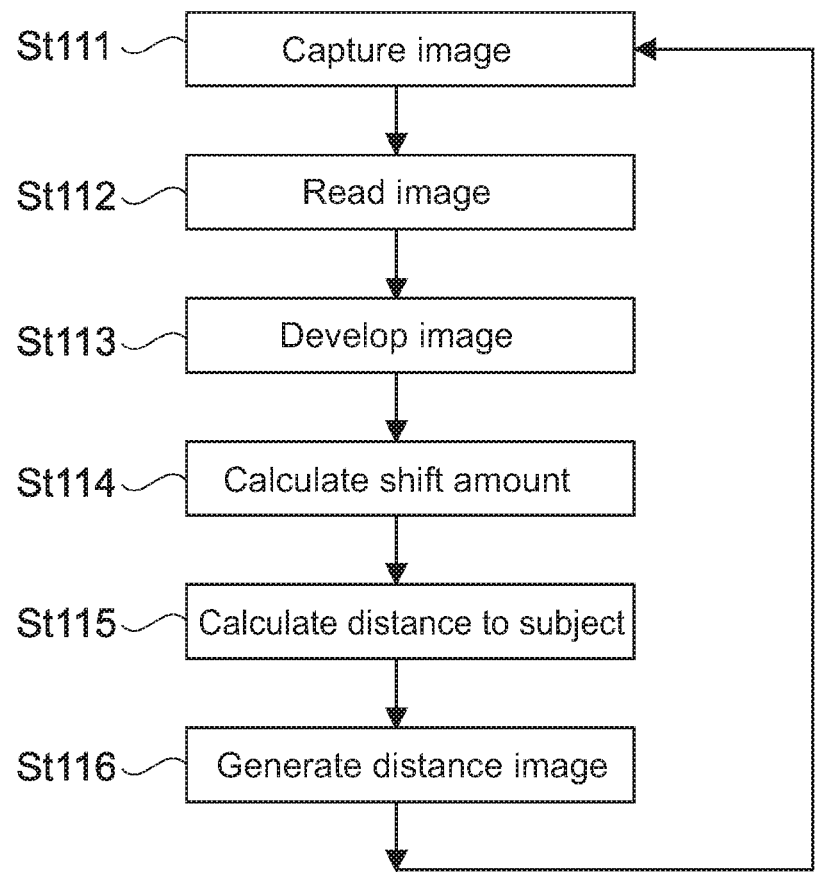
FIG. 26 is a flowchart of a generation of a distance image that is performed by the image-capturing apparatus.

FIG. 26 is a flowchart of an operation of generating a distance image that is performed by the image-capturing apparatus 100. When the imaging element 104 captures an image (St111), the captured image generator 121 generates a captured image. In other words, the imaging element I/F 105 reads an image signal from the imaging element 104 (St112), and provides the image signal to the signal-processing preprocessing section 106.

The signal-processing preprocessing section 106 and the signal processing section 107 develop the read image (St113). The shift amount calculator 122 detects a subject image Z1 and a subject image Z2 in the captured image, and calculates an amount of a shift between the subject image Z1 and the subject image Z2 (St114).

The distance-to-subject calculator 123 calculates a distance to a subject using the shift amount (St115), and provides the calculated distance to a subject to the distance image generator 126. The distance image generator 126 can generate a distance image by determining brightness or color for each specified pixel range according to the distance to a subject. After that, when an image is captured, the image-capturing apparatus 100 repeatedly performs the steps described above. The image-capturing apparatus 100 can generate a distance image, as described above.

[Defocusing Processing]

The image-capturing apparatus 100 can also perform defocusing processing using an amount of a shift between a subject image Z1 and a subject image Z2.

Figure 27:
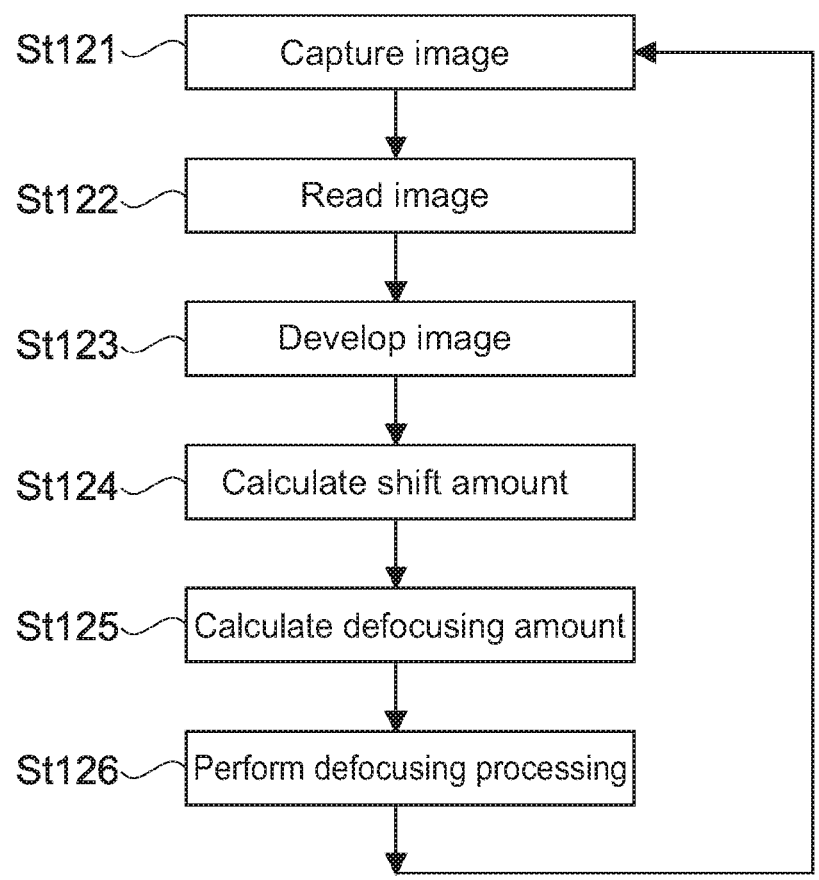
FIG. 27 is a flowchart of defocusing processing performed by the image-capturing apparatus.

FIG. 27 is a flowchart of an operation of defocusing processing performed by the image-capturing apparatus 100. When the imaging element 104 captures an image (St121), the captured image generator 121 generates a captured image. In other words, the imaging element I/F 105 reads an image signal from the imaging element 104 (St122), and provides the image signal to the signal-processing preprocessing section 106.

The signal-processing preprocessing section 106 and the signal processing section 107 develop the read image (St123). The shift amount calculator 122 detects a subject image Z1 and a subject image Z2 in the captured image, and calculates an amount of a shift between the subject image Z1 and the subject image Z2 (St124).

The defocusing processing section 124 calculates a defocusing amount using the shift amount (St125), and performs defocusing processing on the read captured image (St126). The defocusing processing section 124 can perform the defocusing processing by performing convolution of the inverse of a distribution function of known blur.

[Method for Using Image-Capturing Apparatus]

Figure 28A:
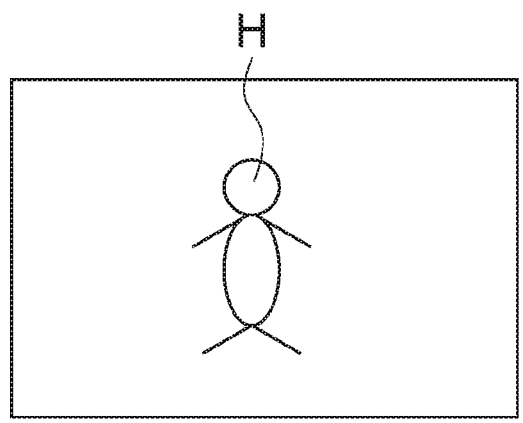
FIGS. 28A, 28B, and 28C schematically illustrate examples of images that can be acquired by the image-capturing apparatus.
Figure 28B:
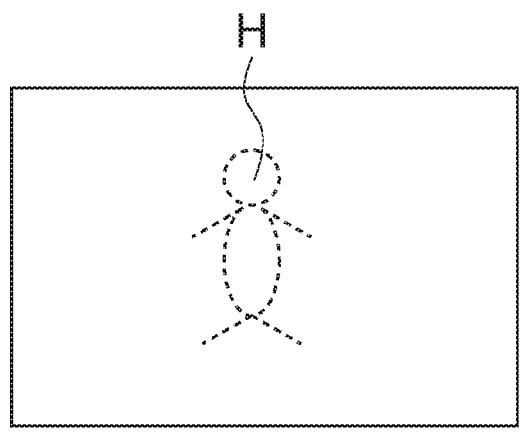
Figure 28C:
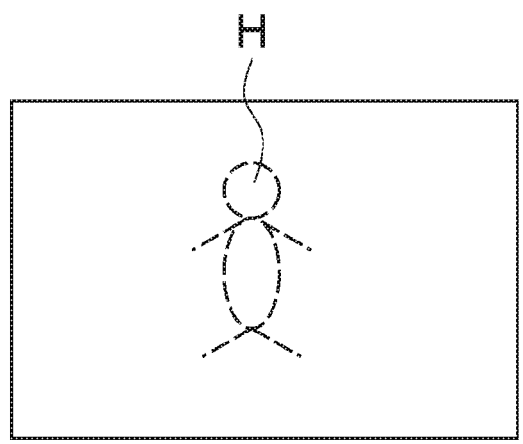

FIGS. 28A, 28B, and 28C schematically illustrates images that can be acquired by the image-capturing apparatus 100. As described above, the image-capturing apparatus 100 makes it possible to capture a visible light image in FIG. 28A, an infrared image in FIG. 28B, and a distance image in FIG. 28C by performing a single piece of image-capturing (performing a single exposure).

Figure 29A:
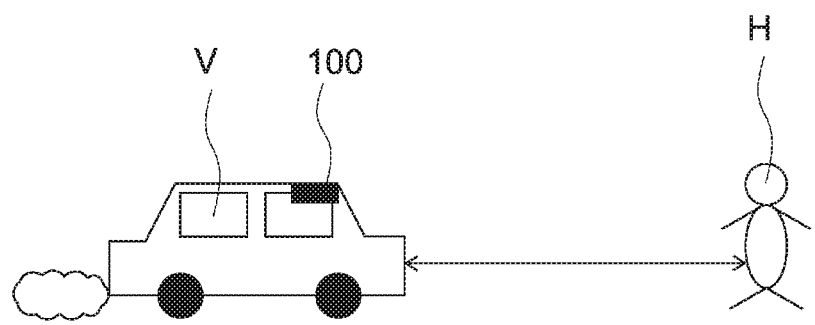
FIGS. 29A and 29B schematically illustrate a state in which the image-capturing apparatus is used.
Figure 29B:
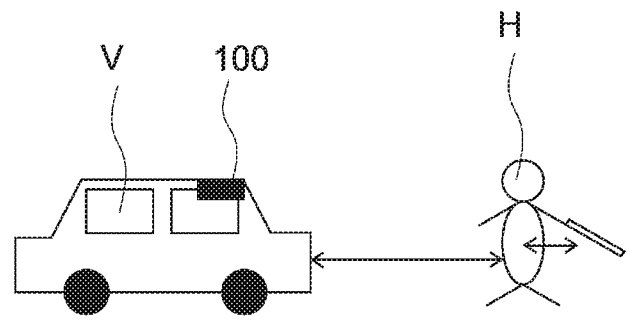

FIGS. 29A and 29B schematically illustrates a vehicle V equipped with the image-capturing apparatus 100, and a subject H. The use of the image-capturing apparatus 100 makes it possible to acquire a visible light image, an infrared image, and a distance image, and to makes it possible to acquire, in a short time, information that is necessary for a movable object such as the vehicle V to perform a quick determination regarding its surroundings when, for example, automatic driving or automatic braking is applied.

For example, a distance between the vehicle V and the subject H can be acquired, as illustrated in FIG. 29A, or, for example, a gesture of a traffic control can be recognized, as illustrated in FIG. 29B. Further, the image-capturing apparatus is highly adaptable to the external environment, and thus is suitable for such usage, since the infrared stop 102 and the visible light stop 103 can be separately adjusted, as described above.

[Installation-Target Apparatus]

The image-capturing apparatus 100 can be installed in various movable objects. FIGS. 30A, 30B, 30C, 30D, and 30E illustrate examples of movable objects equipped with the image-capturing apparatus 100.

The image-capturing apparatus 100 may be installed in a vehicle such as an auto, a truck, or a train, as illustrated in FIG. 30A, or the image-capturing apparatus 100 may be installed in a flight vehicle such as a drone, an airplane, or an airship, as illustrated in FIG. 30B. Further, the image-capturing apparatus 100 may be installed in a remotely controlled apparatus such as a crane, as illustrated in FIG. 30C, or the image-capturing apparatus 100 may be installed in a light vehicle such as a bicycle, as illustrated in FIG. 30D. Furthermore, the image-capturing apparatus 100 may be installed in an independently movable object such as a robot, as illustrated in FIG. 30E. Moreover, the image-capturing apparatus 100 can be installed in various movable objects that can move with respect to a subject.

Particularly in recent years, there has been a need to perform a quick determination regarding an obstacle when, for example, autonomous driving or automatic braking is applied to an auto. The image-capturing apparatus 100 according to the present embodiment is also suitable for such an application, since the image-capturing apparatus 100 according to the present embodiment can acquire a distance to a subject and a visible light image at the same time, and thus can flexibly cope with an amount of external light.

[Mechanism of Infrared Stop]

As described above, the infrared stop 102 includes the opening portion 102a and the blocking portion 102b, and is capable of adjusting a size of the opening portion 102a, the opening portion 102a being a portion through which infrared light and visible light included in the incident light N are transmitted, the blocking portion 102b being a portion that blocks infrared light and through which visible light is transmitted. Such a configuration can be provided as indicated below.

Figure 31:
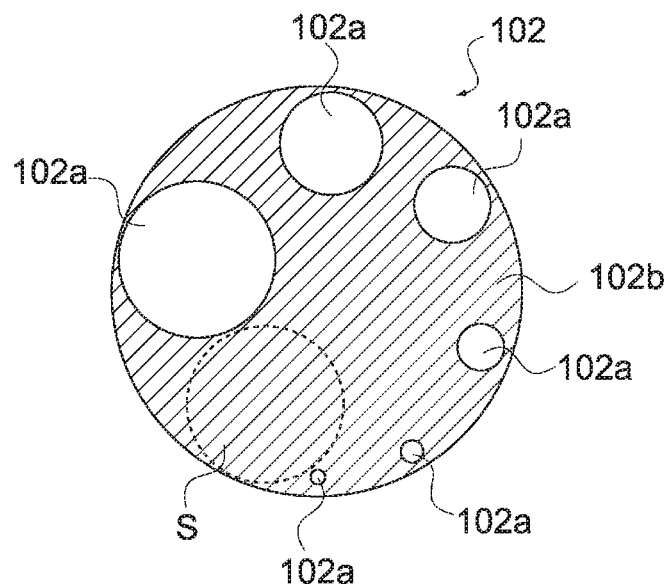
FIG. 31 schematically illustrates a configuration of the infrared stop included in the image-capturing apparatus.
Figure 32:
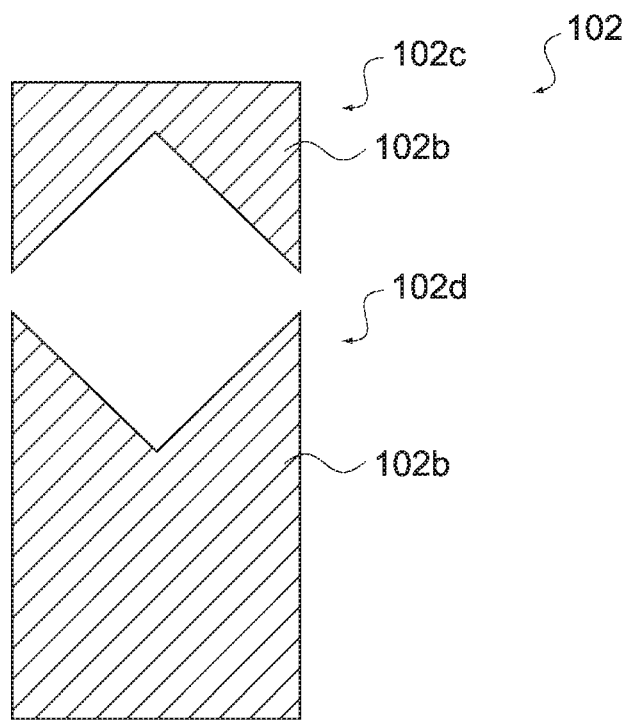
FIG. 32 schematically illustrates a configuration of the infrared stop included in the image-capturing apparatus.
Figures 33A, 33B:
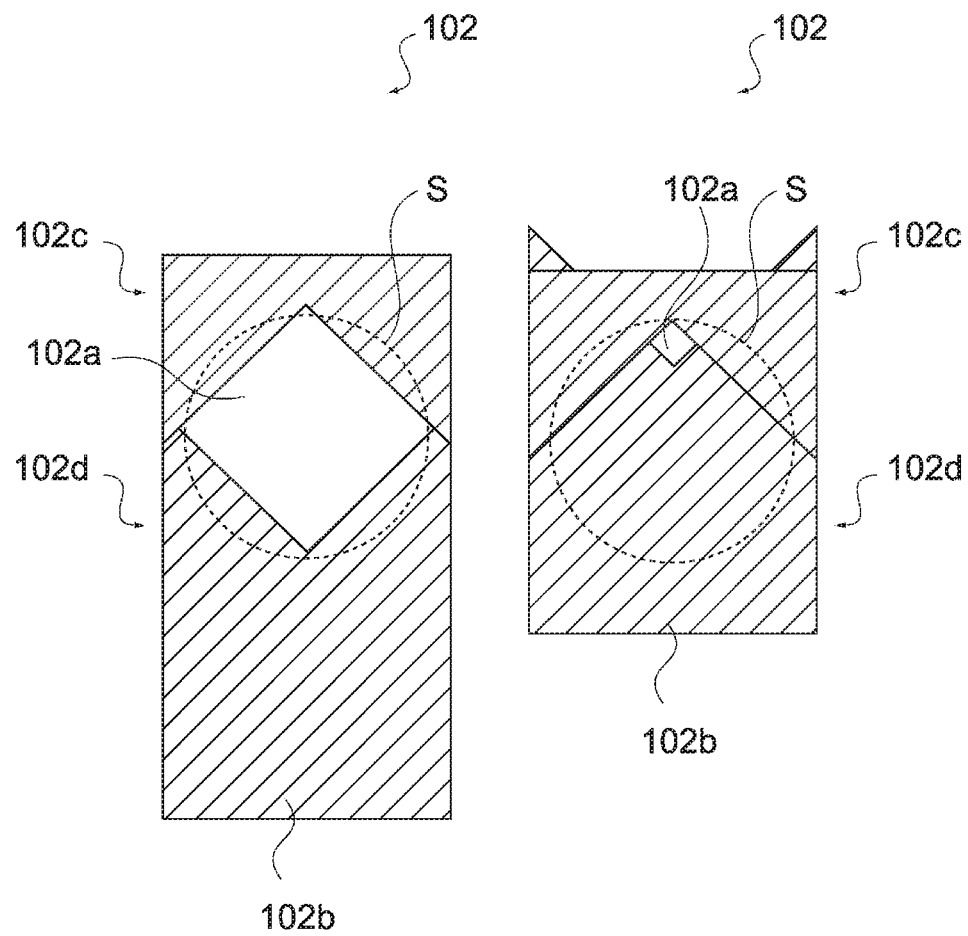
FIGS. 33A and 33B schematically illustrate a configuration of the infrared stop included in the image-capturing apparatus.

FIGS. 31, 32, 33A, 33B, 34A, and 34B schematically illustrate various configurations of the infrared stop 102. In FIGS. 31, 33A, and 33B, a range S represents a range in which the incident light N passes.

As illustrated in FIG. 31, the infrared stop 102 may include a plurality of opening portions 102a having different sizes. The size of the opening portion 102a within the range S can be changed by the infrared stop 102 being rotated.

Further, as illustrated in FIGS. 32A, 33A, and 33B, the infrared stop 102 may also include a first member 102c and a second member 102d, in which the second member 102d moves with respect to the first member 102c. FIG. 33A illustrates a state in which a stop is opened, and FIG. 33B illustrates a state in which the stop is made small. When the second member 102d is moved with respect to the first member 102c, the stop is made smaller while the position of the center of the stop is being shifted.

Figure 34A:
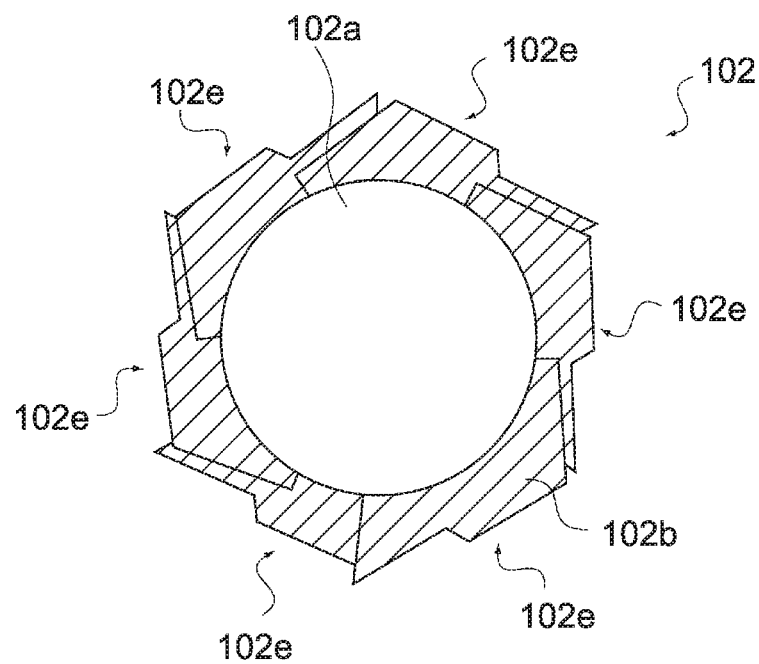
FIGS. 34A and 34B schematically illustrate a configuration of the infrared stop included in the image-capturing apparatus.
Figure 34B:
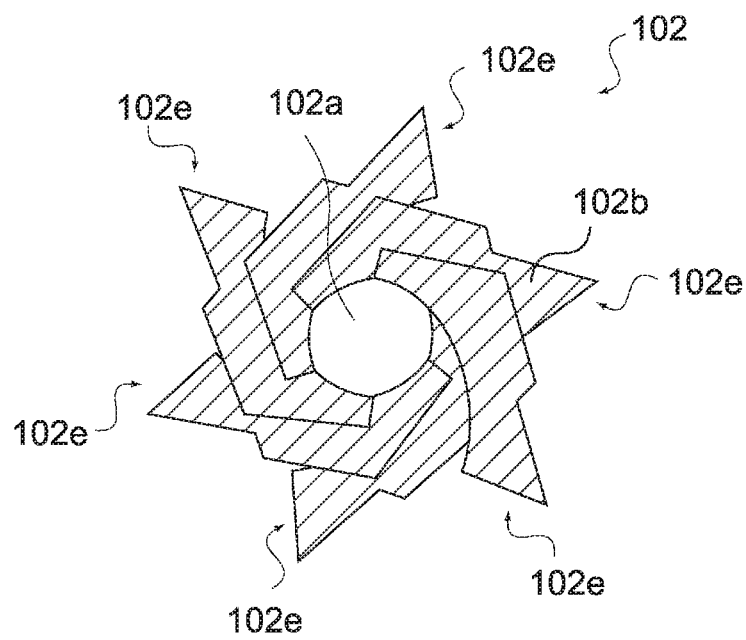

Furthermore, as illustrated in FIGS. 34A and 34B, the infrared stop 102 may also include a plurality of members 102e, in which the size of the opening portion 102a is changed by each member 102e moving. FIG. 34A illustrates a state in which a stop is opened, and FIG. 34B illustrates a state in which the stop is made smaller. The position of the center of the infrared stop 102 can be shifted by moving the stop itself in a state between the state in which the stop is opened (FIG. 34A) and the state in which the stop is made smaller (of FIG. 34B).

[Hardware Configuration]

Figure 35:
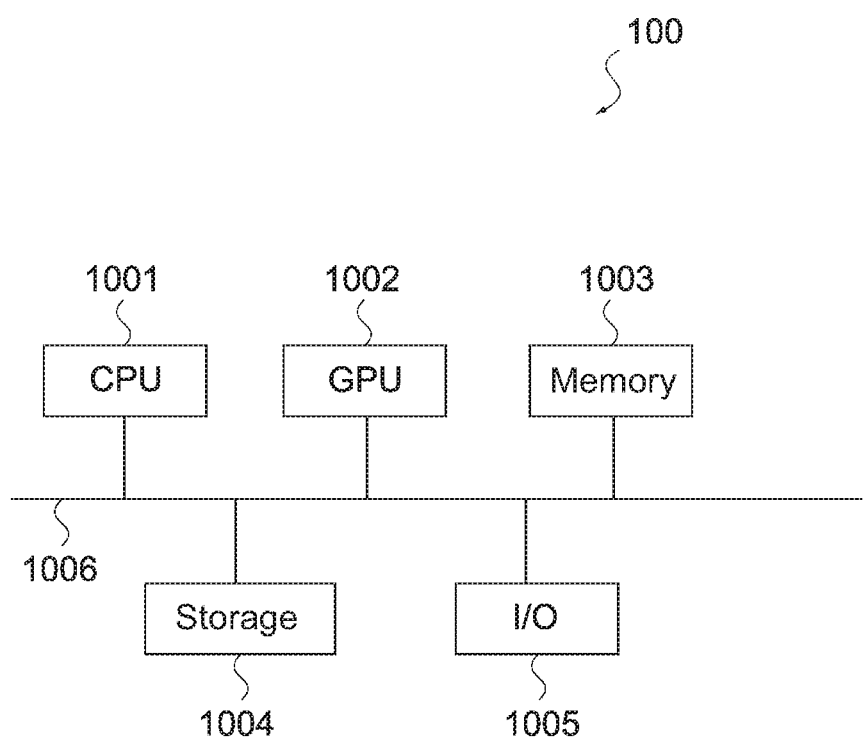
FIG. 35 is a block diagram of a hardware configuration of the image-capturing apparatus.

FIG. 35 schematically illustrates a hardware configuration of the image-capturing apparatus 100. As illustrated in the figure, the image-capturing apparatus 100 includes, as the hardware configuration, a CPU 1001, a GPU 1002, a memory 1003, a storage 1004, and an input/output section (I/O) 1005. They are connected to one another through a bus 1006. Further, the imaging element 104 or the like described above may also be connected to the bus 1006.

The CPU (central processing unit) 1001 controls other components in accordance with a program stored in the memory 1003, and performs data processing in accordance with the program and stores a result of the processing in the memory 1003. The CPU 1001 may be a microprocessor.

The GPU (graphic processing unit) 1002 performs image processing by being controlled by the CPU 1001. The GPU 1002 may be a microprocessor.

The memory 1003 stores therein the program executed by the CPU 1001, and data. The memory 1003 may be a random access memory (RAM).

The storage 1004 stores therein a program and data. The storage 1004 may be a hard disk drive (HDD) or a solid state drive (SSD).

The input/output section 1005 receives an input to the image-capturing apparatus 100, and provides an output from the image-capturing apparatus 100 to the outside. The input/output section 1005 includes an input device such as a keyboard or a mouse, an output device such as a display, and a connection interface such as a network.

The hardware configuration of the image-capturing apparatus 100 is not limited to what has been described above, and it is sufficient if it can provide a functional configuration of the image-capturing apparatus 100. Further, a portion of or all of the hardware configuration may exist on a network.

[Modification]

In the descriptions above, the image-capturing apparatus 100 performs image-capturing with infrared light and visible light that are obtained by performing wavelength separation, but the embodiment is not limited to this example. The image-capturing apparatus 100 may perform image-capturing with first light of a first wavelength and with second light of a second a wavelength that are obtained by performing wavelength separation. It is sufficient if the first wavelength and the second wavelength are different from each other, and each of the wavelengths may be a wavelength of one of infrared light, ultraviolet light, or and visible light.

Note that the present technology may also take the following configurations.

(1) An image-capturing apparatus including:

an imaging element that performs wavelength separation on incident light to obtain first light of a first wavelength and second light of a second wavelength, and photoelectrically converts the first light and the second light, the first light and the second light being included in the incident light;

an optical element that collects light in the image-capturing apparatus;

a first stop that is provided in a path of the incident light, and includes a first opening portion and a first blocking portion, the first opening portion being a portion through which the first light and the second light are transmitted, the first blocking portion being a portion that blocks the first light and through which the second light is transmitted;

a second stop that is provided in the path of the incident light, and includes a second opening portion and a second blocking portion, the second opening portion being a portion through which the first light and the second light are transmitted, the second blocking portion being a portion that blocks the second light and through which the first light is transmitted; and a stop controller that separately controls a size of the first opening portion and a size of the second opening portion.

(2) The image-capturing apparatus according to (1), in which the first wavelength is a wavelength of infrared light, and the second wavelength is a wavelength of visible light.

(3) The image-capturing apparatus according to (1) or (2), in which the first opening portion and the second opening portion are shifted from each other in a direction orthogonal to a direction of an optical axis of the incident light.

(4) The image-capturing apparatus according to any one of (1) to (3), in which at least one of a center of the first opening portion or a center of the second opening portion coincides with a center of an optical axis of the incident light.

(5) The image-capturing apparatus according to (3), further including a distance-to-subject calculator that calculates a distance to a subject using a captured image that is captured by the imaging element, the captured image including a first image that is an image of the first light, and a second image that is an image of the second light.

(6) The image-capturing apparatus according to (5), in which the distance-to-subject calculator calculates the distance to a subject using an amount of a shift between the first image and the second image in the captured image.

(7) The image-capturing apparatus according to (4), in which the first wavelength is a wavelength of infrared light,
the second wavelength is a wavelength of visible light,
the center of the first opening portion is shifted from the center of the optical axis of the incident light, and
the center of the second opening portion coincides with the center of the optical axis of the incident light.

(8) The image-capturing apparatus according to any one of (1) to (7), in which
the imaging element performs wavelength separation for the first wavelength and the second wavelength in a direction orthogonal to an optical axis of the incident light.
(9) The image-capturing apparatus according to any one of (1) to (7), in which
the imaging element performs wavelength separation for the first wavelength and the second wavelength in a direction parallel to an optical axis of the incident light.
(10) The image-capturing apparatus according to (5), further including an optical element controller that controls the optical element according to the distance to a subject.
(11) The image-capturing apparatus according to (5), further including a distance image generator that generates a distance image from the distance to a subject.
(12) The image-capturing apparatus according to (3), further including a defocusing processing section that performs defocusing processing using an amount of a shift between a first image and a second image in a captured image that is captured by the imaging element, the captured image including the first image and the second image, the first image being an image of the first light, the second image being an image of the second light.
(13) The image-capturing apparatus according to any one of (1) to (12), in which
the stop controller controls a size of the first opening portion and a size of the second opening portion according to an amount of the first light entering the imaging element and an amount of the second light entering the imaging element.
(14) The image-capturing apparatus according to any one of (1) to (13), in which
the stop controller controls a distance between a center of the first opening portion and a center of the second opening portion in a direction orthogonal to an optical axis of the incident light according to a movement speed of the image-capturing apparatus.
(15) An image-capturing method using an image-capturing apparatus including
an imaging element that performs wavelength separation on incident light to obtain first light of a first wavelength and second light of a second wavelength, and photoelectrically converts the first light and the second light, the first light and the second light being included in the incident light;
an optical element that collects light in the image-capturing apparatus;
a first stop that is provided in a path of the incident light, and includes a first opening portion and a first blocking portion, the first opening portion being a portion through which the first light and the second light are transmitted, the first blocking portion being a portion that blocks the first light and through which the second light is transmitted; and
a second stop that is provided in the path of the incident light, and includes a second opening portion and a second blocking portion, the second opening portion being a portion through which the first light and the second light are transmitted, the second blocking portion being a portion that blocks the second light and through which the first light is transmitted, in which
a stop controller separately changes a size of the first opening portion and a size of the second opening portion.
(16) A program for controlling an image-capturing apparatus, the image-capturing apparatus including
an imaging element that performs wavelength separation on incident light to obtain first light of a first wavelength and second light of a second wavelength, and photoelectrically converts the first light and the second light, the first light and the second light being included in the incident light;
an optical element that collects light in the image-capturing apparatus;
a first stop that is provided in a path of the incident light, and includes a first opening portion and a first blocking portion, the first opening portion being a portion through which the first light and the second light are transmitted, the first blocking portion being a portion that blocks the first light and through which the second light is transmitted; and
a second stop that is provided in the path of the incident light, and includes a second opening portion and a second blocking portion, the second opening portion being a portion through which the first light and the second light are transmitted, the second blocking portion being a portion that blocks the second light and through which the first light is transmitted, in which
the program controls the image-capturing apparatus as a stop controller that separately changes a size of the first opening portion and a size of the second opening portion.

REFERENCE SIGNS LIST 100 image-capturing apparatus
101 lens
102 infrared stop
103 visible light stop
104 imaging element
105 imaging element I/F
106 signal-processing preprocessing section
107 signal processing section
108 display processing section
109 display section
110 output processing section
111 output section
112 lens controller
113 computing section
114 volatile storage section
115 nonvolatile storage section
116 nonvolatile storage I/F
117 input section
118 input processing section
119 stop controller
121 captured image generator
122 shift amount calculator
123 distance-to-subject calculator
124 defocusing processing section
125 lens-movement-amount calculator
126 distance image generator

The invention claimed is:

1. An image-capturing apparatus, comprising:
an imaging element configured to:
separate incident light into first light of a first wavelength and second light of a second wavelength, wherein the incident light includes the first light and the second light; and
photoelectrically convert the first light and the second light;
an optical element configured to collect the incident light in the image-capturing apparatus;
a first stop in a path of the incident light, wherein
the first stop includes a first opening portion and a first blocking portion,
the first opening portion is configured to transmit each of the first light and the second light, and
the first blocking portion is configured to block the first light and transmit the second light;

a second stop in the path of the incident light, wherein
the second stop includes a second opening portion and a second blocking portion,
the second opening portion is configured to transmit each of the first light and the second light,
the second blocking portion configured to block the second light and transmit the first light is transmitted, and
a center of the second opening portion is shifted from a center of the first opening portion in a direction orthogonal to a direction of an optical axis of the incident light; and
a stop controller configured to:
control a size of the first opening portion; and
control a size of the second opening portion.

2. The image-capturing apparatus according to claim 1, wherein
the first wavelength is a wavelength of infrared light, and
the second wavelength is a wavelength of visible light.

3. The image-capturing apparatus according to claim 1, wherein
one of the center of the first opening portion or the center of the second opening portion coincides with a center of the optical axis of the incident light.

4. The image-capturing apparatus according to claim 1, wherein
the imaging element is further configured to capture an image that includes a first image of the first light and a second image of the second light, and
the image-capturing apparatus further comprises a distance-to-subject calculator configured to calculate a distance of the image-capturing apparatus to a subject based on the captured image.

5. The image-capturing apparatus according to claim 4, wherein the distance-to-subject calculator is further configured to calculate the distance of the image-capturing apparatus to the subject based on an amount of a shift between the first image and the second image.

6. The image-capturing apparatus according to claim 3, wherein
the first wavelength is a wavelength of infrared light,
the second wavelength is a wavelength of visible light,
the center of the first opening portion is shifted from the center of the optical axis of the incident light in the direction orthogonal to the direction of the optical axis of the incident light, and
the center of the second opening portion coincides with the center of the optical axis of the incident light in the direction orthogonal to the direction of the optical axis of the incident light.

7. The image-capturing apparatus according to claim 1, wherein the imaging element is further configured to separate a wavelength of the incident light into the first wavelength and the second wavelength in the direction orthogonal to the direction of the optical axis of the incident light.

8. The image-capturing apparatus according to claim 1, wherein the imaging element is further configured to separate a wavelength of the incident light into the first wavelength and the second wavelength in a direction parallel to the direction of the optical axis of the incident light.

9. The image-capturing apparatus according to claim 4, further comprising: an optical element controller configured to control the optical element based on the calculated distance of the image-capturing apparatus to the subject.

10. The image-capturing apparatus according to claim 4, further comprising a distance image generator configured to generate a distance image from the calculated distance of the image-capturing apparatus to the subject.

11. The image-capturing apparatus according to claim 1, wherein
the imaging element is further configured to capture an image that includes a first image of the first light and a second image of the second light, and
the image-capturing apparatus further comprises a defocusing processing section configured to execute a defocus process based on an amount of a shift between the first image and the second image.

12. The image-capturing apparatus according to claim 1, wherein
the stop controller controls is further configured to:
control the size of the first opening portion based on an amount of the first light entering the imaging element; and
control the size of the second opening portion based on an amount of the second light entering the imaging element.

13. The image-capturing apparatus according to claim 1, wherein
the stop controller is further configured to control a distance between the center of the first opening portion and the center of the second opening portion in the direction orthogonal to the optical axis of the incident light, and
the distance is controlled based on a movement speed of the image-capturing apparatus.

14. An image-capturing method, comprising:
separating, by an imaging element of an image-capturing apparatus, incident light to obtain into first light of a first wavelength and second light of a second wavelength, wherein the incident light includes the first light and the second light;
photoelectrically converts converting, by the imaging element, the first light and the second light, the first light and the second light being included in the incident light;
collecting, by an optical element of the image-capturing apparatus, the incident light in the image-capturing apparatus;
transmitting, by a first opening portion of a first stop of the image-capturing apparatus, each of the first light and the second light, wherein the first stop is provided in a path of the incident light;
blocking, by a first blocking portion of the first stop the first light;
transmitting, by the first blocking portion, the second light;
transmitting, by a second opening portion of a second stop of the image-capturing apparatus, each of the first light and the second light, wherein the second stop in the path of the incident light;
transmitting, by a second blocking portion of the second stop, the second light;
transmitting, by the second blocking portion, the first light, wherein a center of the second opening portion is shifted from a center of the first opening portion in a direction orthogonal to a direction of an optical axis of the incident light;
controlling, by a stop controller of the image-capturing apparatus, a size of the first opening portion; and
controlling, by the stop controller, a size of the second opening portion.

15. A non-transitory computer-readable medium having stored thereon computer-executable instructions that, when executed by an image-capturing apparatus, cause the image-capturing apparatus to execute operations, the operations comprising:

separating, by an imaging element of the image-capturing apparatus, incident light into first light of a first wavelength and second light of a second wavelength, wherein the incident light includes the first light and the second light;

photoelectrically converting, by the imaging element, the first light and the second light;

collecting, by an optical element of the image-capturing apparatus, the incident light in the image-capturing apparatus;

transmitting, by a first opening portion of a first stop of the image-capturing apparatus, each of the first light and the second light, wherein the first stop is provided in a path of the incident light;

blocking, by a first blocking portion of the first stop, the first light;

transmitting, by the first blocking portion, the second light;

transmitting, by a second opening portion of a second stop of the image-capturing apparatus, each of the first light and the second light, wherein the second stop in the path of the incident light;

blocking, by a second blocking portion of the second stop, the second light;

transmitting, by the second blocking portion, the first light, wherein a center of the second opening portion is shifted from a center of the first opening portion in a direction orthogonal to a direction of an optical axis of the incident light;

controlling, stop controller of the image-capturing apparatus, a size of the first opening portion; and controlling, by the stop controller, a size of the second opening portion.

\* \* \* \* \*